(12) United States Patent
Sakhnini et al.

(10) Patent No.: US 12,047,940 B2
(45) Date of Patent: Jul. 23, 2024

(54) INTERMITTENT USABLE TIME DOMAIN RESOURCES

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US); Jun Ma, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/468,231

(22) Filed: Sep. 7, 2021

(65) Prior Publication Data

US 2023/0074563 A1 Mar. 9, 2023

(51) Int. Cl.
*H04W 72/04* (2023.01)
*H04W 72/0446* (2023.01)
*H04W 72/1263* (2023.01)
*H04W 72/23* (2023.01)
*H04W 80/02* (2009.01)

(52) U.S. Cl.
CPC ... *H04W 72/1263* (2013.01); *H04W 72/0446* (2013.01); *H04W 72/23* (2023.01); *H04W 80/02* (2013.01)

(58) Field of Classification Search
CPC ......... H04W 72/1263; H04W 72/0446; H04W 72/042; H04W 72/0413; H04W 80/02; H04W 72/126; H04W 72/044; H04W 72/041; H04L 5/0057; H04L 5/0051; H04L 5/005
See application file for complete search history.

(56) References Cited

U.S. PATENT DOCUMENTS

| | | |
|---|---|---|
| 2009/0180451 A1 | 7/2009 | Alpert et al. |
| 2010/0234071 A1* | 9/2010 | Shabtay .................. H04B 7/155 455/562.1 |
| 2020/0052861 A1* | 2/2020 | Li .......................... H04L 5/0057 |
| 2022/0248383 A1* | 8/2022 | Park ....................... H04W 72/23 |
| 2023/0098368 A1* | 3/2023 | Yu ...................... H04W 72/0446 370/281 |

* cited by examiner

*Primary Examiner* — Wei Zhao
(74) *Attorney, Agent, or Firm* — Sevan Savsa; Loza & Loza LLP

(57) ABSTRACT

Aspects relate to techniques for configuring intermittent time domain resources that are usable by a user equipment (UE) for communication with a base station. The base station may transmit a usable time domain resource (TDR) configuration to the UE that indicates the usable time resources that are available to the UE for communication with the base station. The UE may then communicate with the base station based on the usable TDR configuration.

30 Claims, 22 Drawing Sheets ated and described below. Note, as used herein, the terms "access terminal," "mobile station (MS)," "subscriber station," "mobile unit," "subscriber unit," "wireless unit," "remote unit," "mobile device," "wireless device," "wireless communications device," "remote device," "mobile subscriber station," "user terminal," "user device," "mobile terminal," "wireless terminal," "remote terminal," "handset," "terminal," "user agent," "mobile client," "client," or some other suitable terminology are used interchangeably. In some
INTERMITTENT USABLE TIME DOMAIN RESOURCES

TECHNICAL FIELD

The technology discussed below relates generally to wireless communication systems, and more particularly, to configuring intermittent usable time domain resources for a user equipment (UE).

INTRODUCTION

Fifth Generation (5G) New Radio (NR) networks may deploy cells that utilize either a millimeter wave (e.g., frequency range designation FR2 or higher) carrier or a sub-6 GHz (e.g., FR1) carrier to facilitate communication between a base station and a user equipment (UE). For higher NR operating bands (e.g., FR2 or higher), several different waveforms are being considered for downlink and uplink operation. Examples include orthogonal frequency division multiplexing (OFDM) cyclic prefix (CP-OFDM), single carrier frequency domain (FD) implementations, such as discrete Fourier transform-spread-OFDM (DFT-s-OFDM), or single carrier time domain (TD) implementations, such as single carrier quadrature amplitude modulation (SC-QAM).

Communicating on the higher NR operating bands using any of the NR waveform types may result in an increase in the complexity at the UE. For example, for CP-OFDM or DFT-s-OFDM, the UE may perform a number of discrete Fourier transform (DFT) operations (e.g., inverse fast Fourier transform (IFFT) or fast Fourier transform (FFT) operations) at the transmitter or receiver per symbol. FFT operations may also be performed for SC-QAM per symbol when utilizing a single tap frequency domain equalizer (FDE) at the receiver. In the higher NR operating bands, the symbol duration may be shorter due to a larger subcarrier spacing (SCS). Therefore, the number of DFT operations performed per unit of time may increase as the symbol duration decreases, thus resulting in increased complexity at the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a radio access network (RAN) node configured for wireless communication is disclosed. The RAN node includes a transceiver, a memory, a processor coupled to the transceiver and the memory. The processor and the memory are configured to transmit a usable time domain resource (TDR) configuration to a user equipment (UE) via the transceiver. The usable TDR configuration indicating usable time resources of a plurality of time resources. The usable time resources being available to the UE for communication with the RAN node. The processor and the memory are further configured to communicate with the UE via the transceiver based on the usable TDR configuration.

Another example provides a method of wireless communication at a radio access network (RAN) node. The method includes transmitting a usable time domain resource (TDR) configuration to a user equipment (UE). The usable TDR configuration indicating usable time resources of a plurality of time resources. The usable time resources being available to the UE for communication with the RAN node. The method further includes communicating with the UE based on the usable TDR configuration.

Another example provides a user equipment (UE) configured for wireless communication. The UE includes a transceiver, a memory, and a processor coupled to the transceiver and the memory. The processor and the memory are configured to receive a usable time domain resource (TDR) configuration from a radio access network (RAN) node via the transceiver. The usable TDR configuration indicating usable time resources of a plurality of time resources. The usable time resources being available to the UE for communication with the RAN node. The processor and the memory are further configured to communicate with the RAN node via the transceiver based on the usable TDR configuration.

Another example provides a method of wireless communication at a user equipment (UE). The method includes receiving a usable time domain resource (TDR) configuration from a radio access network (RAN) node. The usable TDR configuration indicating usable time resources of a plurality of time resources. The usable time resources being available to the UE for communication with the RAN node. The method further includes communicating with the RAN node based on the usable TDR configuration.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

Figure 1:
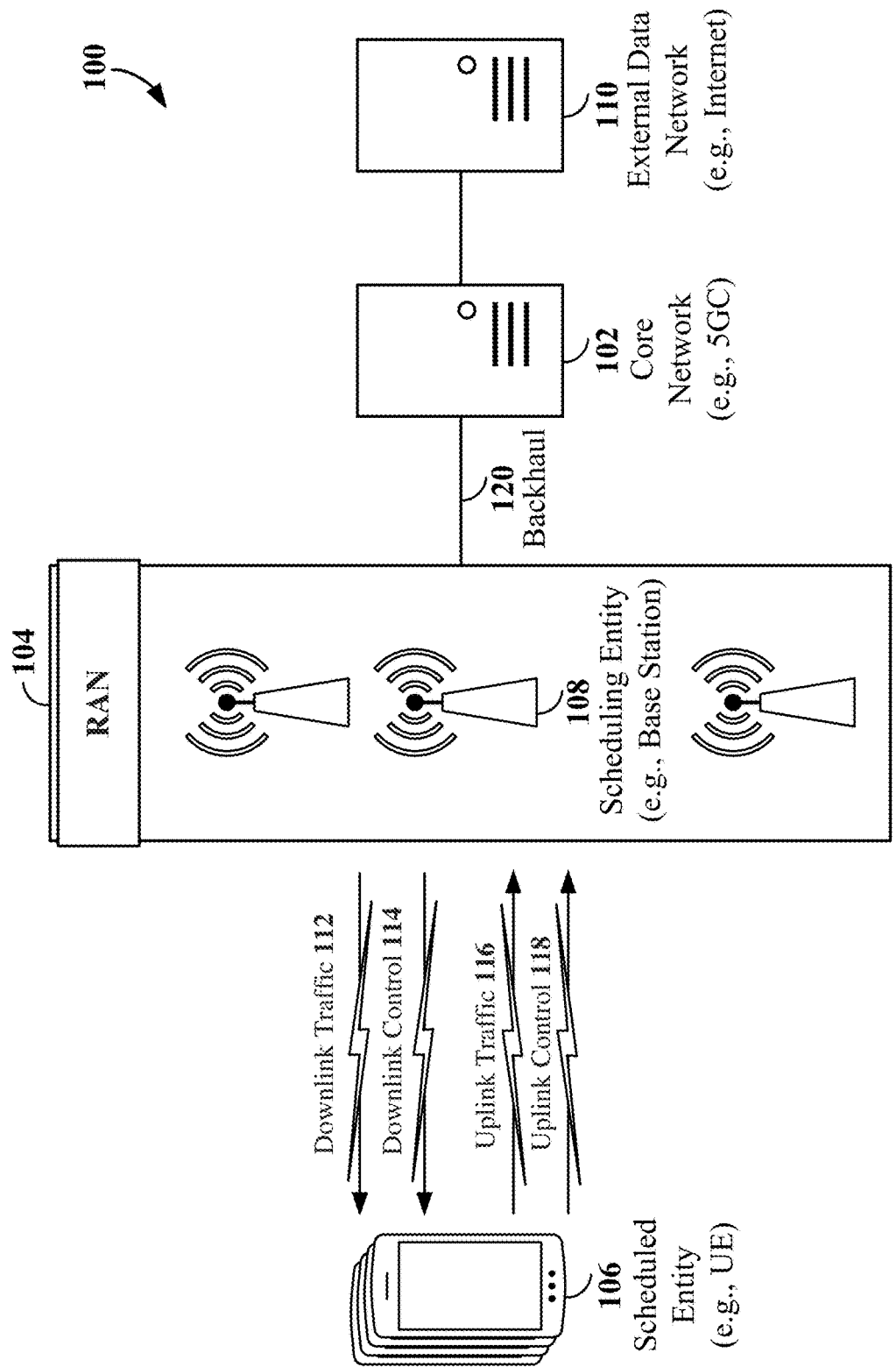
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements, end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Higher NR operating bands (e.g., FR2 or higher) may provide larger bandwidths, but may also suffer from higher phase noise, higher peak-to-average-power ratio (PAPR), and increased UE complexity. For example, higher NR operating bands may utilize larger subcarrier spacings (SCSs), which result in shorter symbol durations. At these larger SCSs, the number of DFT operations per unit time may increase, thus increasing the UE complexity. In addition, since the receiver (Rx) at the UE may have different processing loads at different times (e.g., due to scheduling, the number of multiple-input multiple-output (MIMO) layers being utilized, and beam management (BM) procedures or other procedures being performed), the average complexity of the UE over time may vary. Furthermore, at higher NR operating bands with larger SCS, the scheduling may typically be cross-slot, since the downlink control information (DCI) processing time may be in the order slots (e.g., due to the shorter symbols). These channel processing delays may further increase the UE complexity at the higher NR operating bands, which may result in an increase of the UE cost and/or UE power consumption.

Therefore, various aspects relate to adapting the time domain resources usable by the UE for downlink or uplink communications to enable intermittent time domain resource utilization by the UE. By adapting the usable time domain resources, the average complexity of the UE over time may be reduced, thus reducing the UE cost and/or power consumption.

A radio access network (RAN) node, such as a base station, may configure usable time resources for the UE and transmit a usable time domain resource (TDR) configuration to the UE that indicates the usable time resources. The usable time resources correspond to those time resources that are available to the UE for communication (e.g., downlink or uplink) with the base station. In some examples, the TDR configuration may be semi-statically configured (e.g., using radio resource control (RRC) signaling) or dynamically configured (e.g., using medium access control (MAC) control element (MAC-CE) or DCI).

In some examples, the usable TDR configuration may have a time domain resource granularity at the symbol level or the slot level. In addition, the usable TDR configuration may include a reduction factor or a pattern mask indicating the usable time resources. In some examples, the reduction pattern or pattern mask may be aligned to a time domain resource boundary (e.g., slot, subframe, frame, etc.). In other examples, the reduction factor or pattern mask may repeat back-to-back over time.

In some examples, the unusable (e.g., unavailable) time resources may collide (e.g., overlap) with a pre-defined channel or signal. For example, the base station may configure a semi-persistently scheduled (SPS) downlink transmission or a configured grant uplink transmission for the UE. If at least a portion of the time resources allocated to the SPS or configured grant (SPS/CG) transmission overlap unusable time resources (e.g., as configured by the usable TDR configuration), the base station and UE may either drop the SPS/CG transmission, ignore the usable TDR configuration and transmit the SPS/CG transmission, or rate-match the SPS/CG transmission around the unusable time resources. For example, if the reduction factor or pattern mask has a symbol-level granularity, the base station and UE can rate-match the SPS/CG transmission around the unusable time resources without changing the SPS/CG configuration.

In some examples, the usable TDR configuration may be activated by the base station and remain active until the base station explicitly changes or deactivates the usable TDR configuration. In some examples, the usable TDR configuration may be timer-based. For example, the base station and UE may initialize a timer upon reception of the usable TDR configuration by the UE and deactivate the usable TDR configuration upon expiration of the timer.

In some examples, the base station and UE may utilize a time domain resource number scheme based on the usable TDR configuration. For example, the time domain resource numbering scheme may be based on all of the symbols or slots regardless of whether the symbols/slots are usable or unusable. As another example, the time domain resource numbering scheme may exclude the unusable symbols/slots.

In some examples, the base station may configure a plurality of usable TDR configurations for the UE (e.g., using RRC signaling) and activate one or more of the usable TDR configurations (e.g., using RRC signaling, a MAC-CE or DCI). For example, the base station may configure the UE with one or more codepoints, each representing one or more usable TDR configurations. The base station may then activate one of the codepoints to activate the corresponding one or more usable TDR configurations. In some examples, the base station may configure the plurality of usable TDR configurations and/or select the usable TDR configuration(s) to activate based on a UE capability. In some examples, the UE may transmit a request for a particular usable TDR configuration to the UE. For example, the UE may request a particular usable TDR configuration based on one or more rules (e.g., metrics, thresholds, etc.). The one or more rules may be pre-configured on the UE or signaled by the base station (e.g., via RRC signaling). For example, the one or more rules may be applied based on the number of expected or configured MIMO layers or BM procedures on the UE. The one or more rules may further be applied per UE antenna panel or group of UE antenna panels.

In some examples, the usable TDR configuration may be associated with an initialization time of the usable TDR configuration. In some examples, the initialization time may be included in the usable TDR configuration, pre-configured on the UE or separately configured by the base station. The initialization time may provide a time gap between receipt of the usable TDR configuration and initializing (application of) the usable TDR configuration. In some examples, the initialization time may be based on the UE capability.

In some examples, the usable TDR configuration may be a universal configuration or may be associated with one or more of at least one transmission configuration indicator (TCI) state, at least one sub-band, at least one antenna panel on the UE, or a group of UEs including the UE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
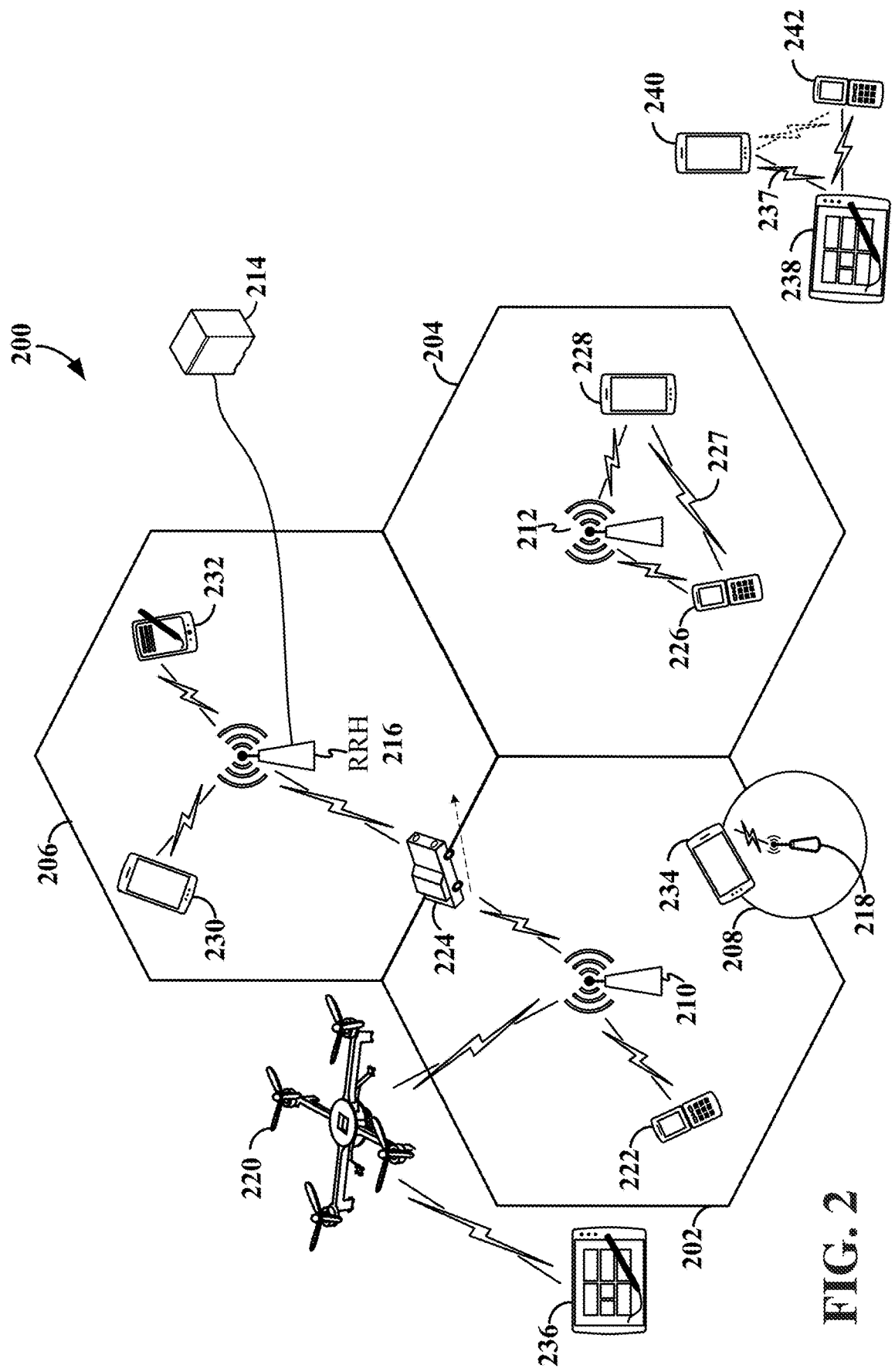
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP-OFDM). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
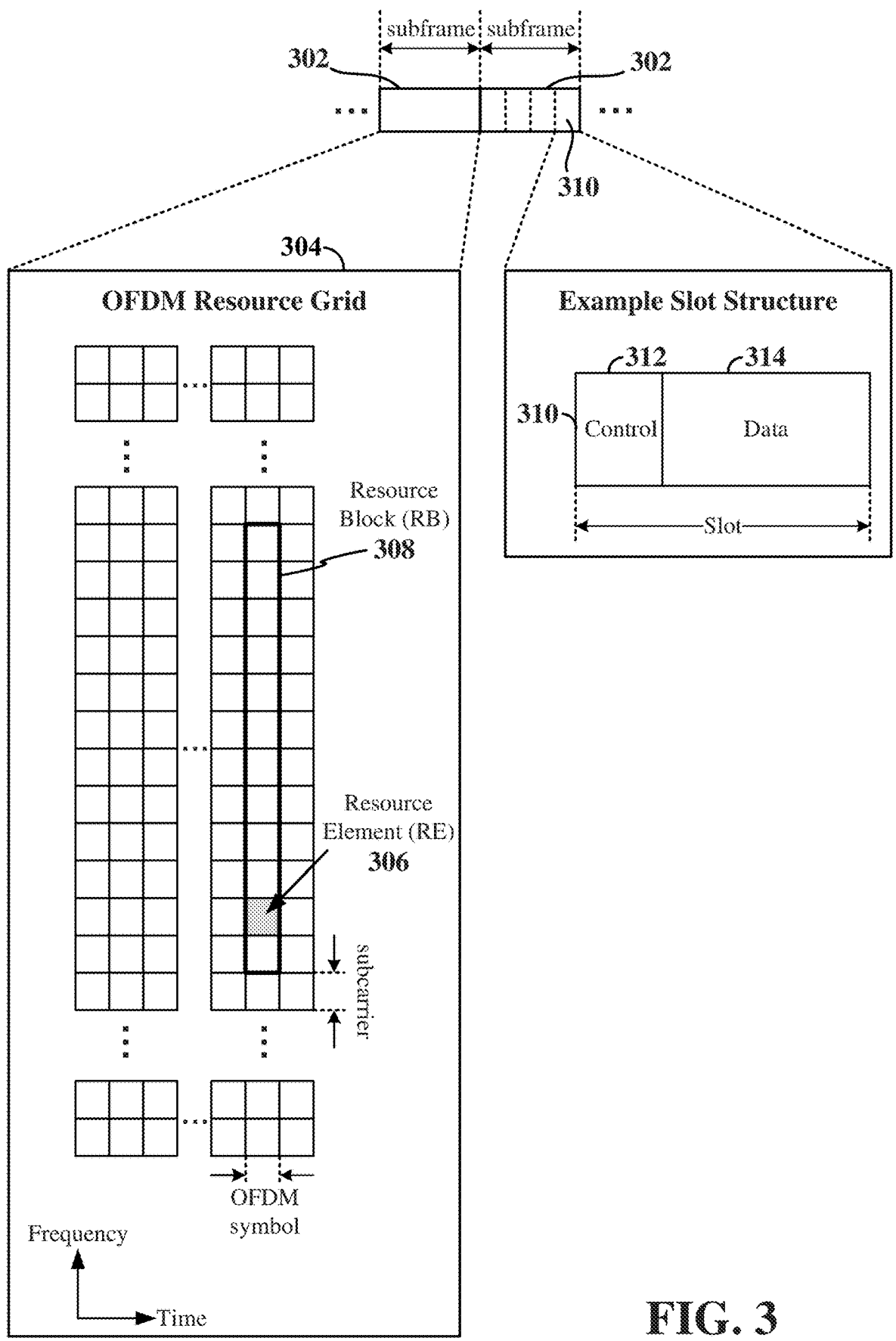
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
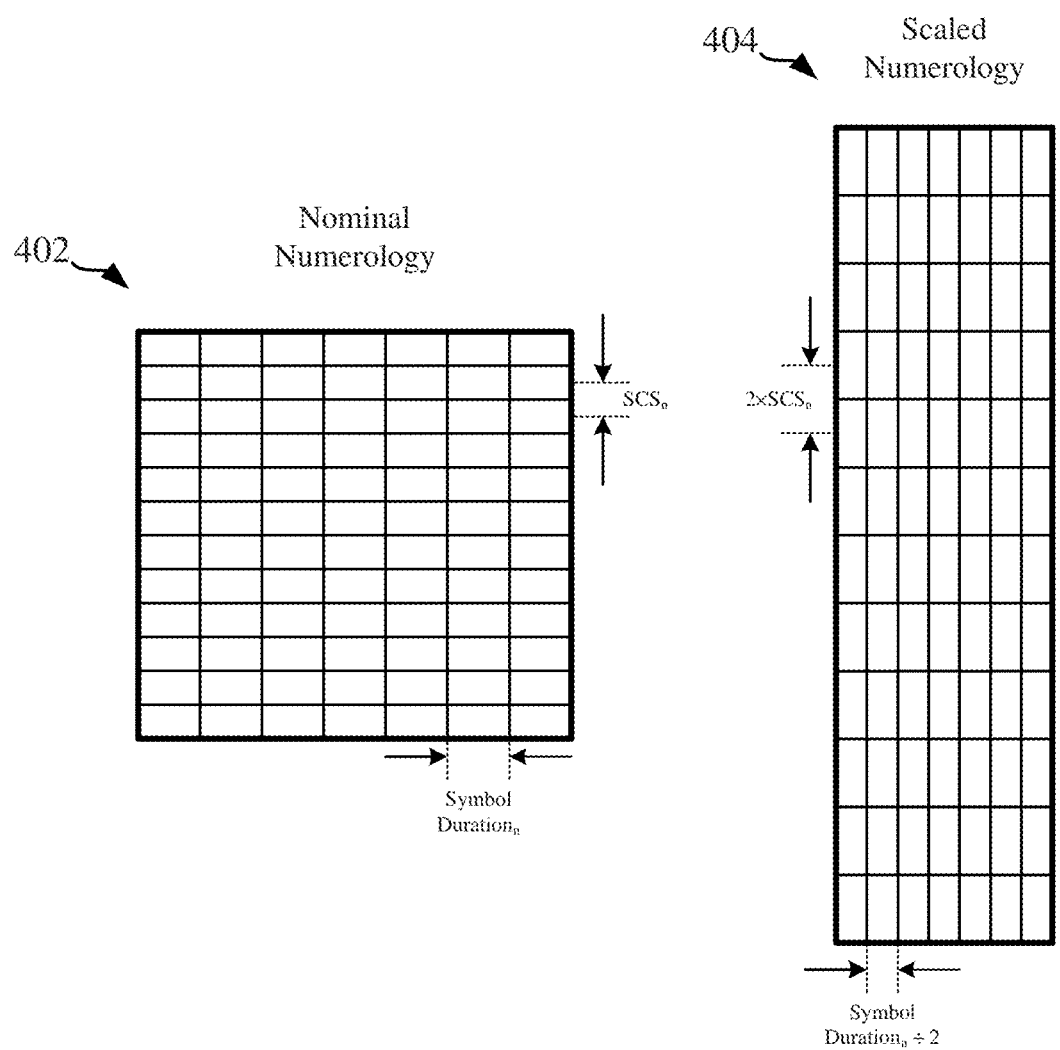
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing (SCSn) of 30 kHz, and a 'nominal' symbol duration of 333 μs. Here, in the second RB 404, the scaled numerology includes a scaled SCS of double the nominal SCS, or 2×SCSn=60 kHz. Because this provides twice the bandwidth per symbol, it results in a shortened symbol duration to carry the same information. Thus, in the second RB 404, the scaled numerology includes a scaled symbol duration of half the nominal symbol duration, or (symbol durationn)÷2=167 μs.

Figure 5:
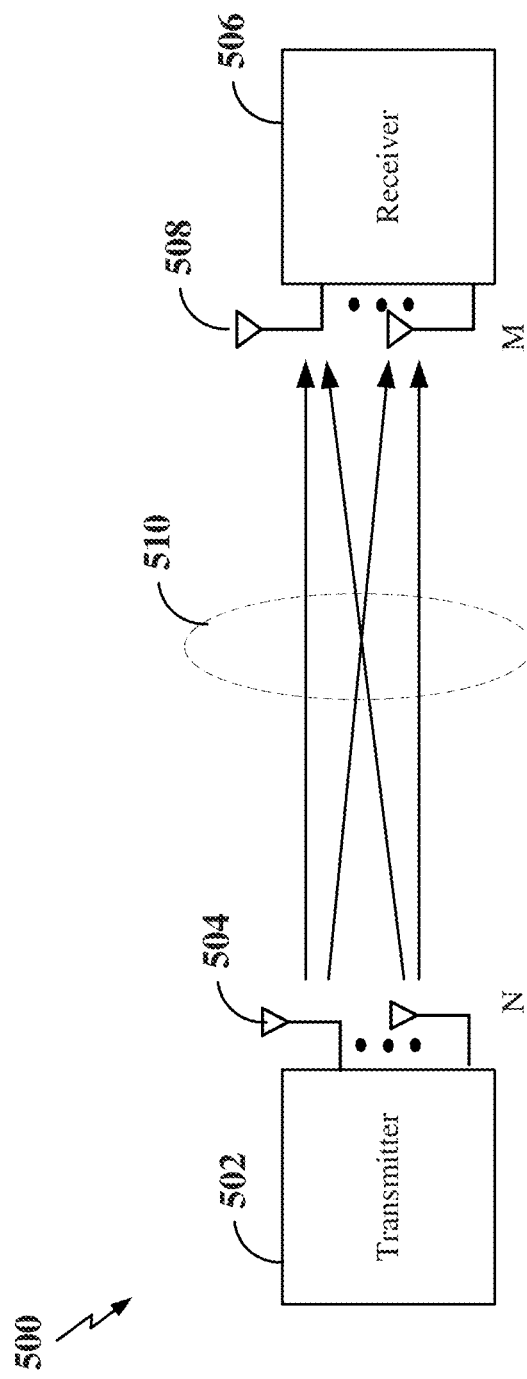
FIG. 5 is a diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 5 illustrates an example of a wireless communication system 500 supporting beamforming and/or MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506. In some examples, the antenna elements may be mapped to antenna ports for generation of beams Here, the term antenna port refers to a logical port (e.g., a beam) over which a signal (e.g., a data stream or layer) may be transmitted. In an example of a base station, an antenna array may include 128 antenna elements (e.g., within a 16×8 array) that may be mapped to 32 antenna ports by an 8×1 combiner.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink signals and channels, including the physical uplink control channel (PUCCH), physical uplink shared channel (PUSCH), and sounding reference signal (SRS). In addition, beamformed signals may further be utilized in D2D systems, such as NR sidelink (SL) or V2X, utilizing FR2.

Figure 6:
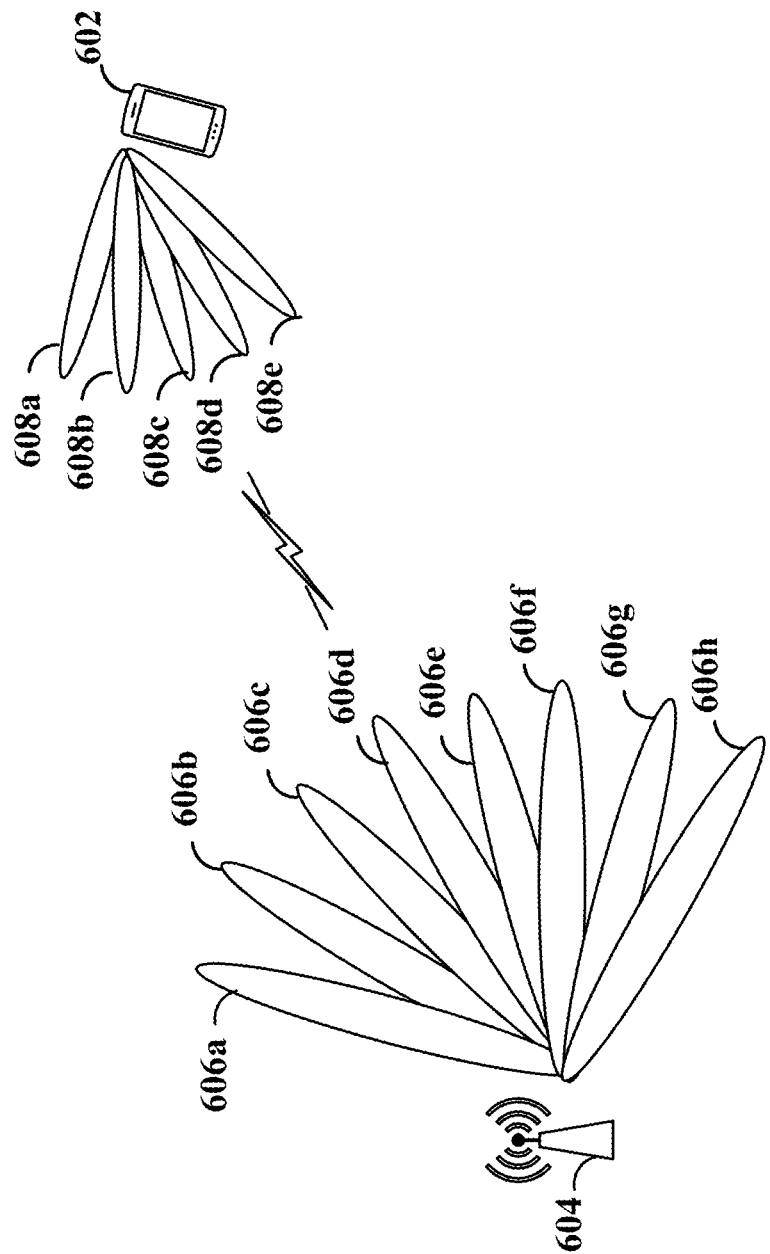
FIG. 6 is a diagram illustrating an example of communication between a radio access network (RAN) node and a wireless communication device using beamforming according to some aspects.

FIG. 6 is a diagram illustrating communication between a base station 604 and a UE 602 using beamformed signals according to some aspects. The base station 604 may be any of the base stations (e.g., gNBs) or scheduling entities illustrated in FIGS. 1 and/or 3, and the UE 602 may be any of the UEs or scheduled entities illustrated in FIGS. 1 and/or 3.

The base station 604 may generally be capable of communicating with the UE 602 using one or more transmit beams, and the UE 602 may further be capable of communicating with the base station 604 using one or more receive beams. As used herein, the term transmit beam refers to a beam on the base station 604 that may be utilized for downlink or uplink communication with the UE 602. In addition, the term receive beam refers to a beam on the UE 602 that may be utilized for downlink or uplink communication with the base station 604.

In the example shown in FIG. 6, the base station 604 is configured to generate a plurality of transmit beams 606a-606h. One or more of the transmit beams can be associated with a different spatial direction in some scenarios. In addition or alternatively, the UE 602 may be configured to generate a plurality of receive beams 608a-608e, each associated with a different spatial direction. It should be noted that while some beams are illustrated as adjacent to one another, such an arrangement may be different in different aspects. For example, transmit beams 606a-606h transmitted during a same symbol may not be adjacent to one another. In some examples, the base station 604 and UE 602 may each transmit more or less beams distributed in all directions (e.g., 360 degrees) and in three-dimensions. In addition, the transmit beams 606a-606h may include beams of varying beam width. For example, the base station 604 may transmit certain signals (e.g., SSBs) on wider beams and other signals (e.g., CSI-RSs) on narrower beams.

The base station 604 and UE 602 may select one or more transmit beams 606a-606h on the base station 604 and one or more receive beams 608a-608e on the UE 602 for communication. Beam selection can occur using uplink and downlink signals between the BS and UE using a beam management procedure. In one example, during initial cell acquisition, the UE 602 may perform a P1 beam management procedure. The P1 beam management procedure can include scanning one or more of the plurality of transmit beams 606a-606h on the plurality of receive beams 608a-608e to select a beam pair link (e.g., one of the transmit beams 606a-606h. The P1 procedure may also include selecting one or more of the receive beams 608a-608e) for a physical random access channel (PRACH) procedure for initial access to the cell. For example, periodic SSB beam sweeping may be implemented on the base station 604 at certain intervals (e.g., based on the SSB periodicity, which may be, for example 20 ms). Thus, the base station 604 may be configured to sweep or transmit an SSB on each of a plurality of wider transmit beams 606a-606h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the P1 beam management and/or PRACH procedure, the base station 604 and UE 602 may perform a P2 beam management procedure. A P2 beam management procedure can aid in beam refinement at the base station 604. For example, the base station 604 may be configured to sweep or transmit a CSI-RS on each of a plurality of narrower transmit beams 606a-606h. Each of the narrower CSI-RS beams may be a sub-beam of the selected SSB transmit beam and/or other SSB transmit beams (e.g., within the spatial direction of one or more SSB transmit beams). Transmission of the CSI-RS transmit beams may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)). The UE 602 is configured to scan the plurality of CSI-RS transmit beams 606a-606h on the plurality of receive beams 608a-608e. The UE 602 then performs beam measurements (e.g., RSRP, SINR, etc.) of the received CSI-RSs on each of the receive beams 608a-608e to determine the respective beam quality of each of the CSI-RS transmit beams 606a-606h as measured on each of the receive beams 608a-608e.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606a-606h on one or more of the receive beams 608a-608e to the base station 604. The base station 604 may then select one or more CSI-RS transmit beams on which to communicate downlink and/or uplink control and/or data with the UE 602. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure (e.g., beam refinement procedure) including a UE beam scan to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 604 may configure the UE 602 to perform SSB beam measurements. For example, the base station 604 may configure the UE 602 to perform SSB beam measurements and/or CSI-RS beam measurements for beam failure detection (BFD), beam failure recovery (BFR), cell reselection, beam refinement (e.g., a P3 procedure), beam tracking (e.g., for a mobile UE 602 and/or base station 604), or other beam optimization purpose.

In addition, when the channel is reciprocal, the transmit and receive beams may be selected using an uplink beam management scheme. In an example, the UE 602 may be configured to sweep or transmit on each of a plurality of receive beams 608a-608e. For example, the UE 602 may transmit an SRS on each beam in the different beam directions. In addition, the base station 604 may be configured to receive the uplink beam reference signals on a plurality of transmit beams 606a-606h. The base station 604 then performs beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The base station 604 may then select one or more transmit beams on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 606d) on the base station 604 and a single receive beam (e.g., beam 608c) on the UE may form a single BPL used for communication between the base station 604 and the UE 602. In another example, multiple CSI-RS transmit beams (e.g., beams 606c, 606d, and 606e) on the base station 604 and a single receive beam (e.g., beam 608c) on the UE 602 may form respective BPLs used for communication between the base station 604 and the UE 602. In another example, multiple CSI-RS transmit beams (e.g., beams 606c, 606d, and 606e) on the base station 604 and multiple receive beams (e.g., beams 608c and 608d) on the UE 602 may form multiple BPLs used for communication between the base station 604 and the UE 602. In this example, a first BPL may include transmit beam 606c and receive beam 608c, a second BPL may include transmit beam 606d and receive beam 608c, and a third BPL may include transmit beam 606e and receive beam 608d.

Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in quasi-colocation (QCL). Two antenna ports may be considered quasi co-located if properties of the channel over which a symbol on one antenna port is conveyed can be inferred from the channel over which a symbol on the other antenna port is conveyed. In 5G NR, UE are equipped with channel estimation, frequency offset error estimation and synchronization procedures for processing QCL. For example, if UE knows that the radio channels corresponding to two different antenna ports is QCL in terms of Doppler shift, then the UE can determine the Doppler shift for one antenna port and then apply the result on both antenna ports for channel estimation. This avoids the UE having to calculate Doppler shift for both antenna ports separately.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

QCL information may be conveyed via transmission configuration indicator (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for a downlink transmission, a joint DL/UL TCI, or spatial relation information for an UL transmission. For example, the TCI state can include one or more reference signal IDs, each identifying an SSB resource, a CSI-RS resource, or an SRS resource. Each resource (SSB, CSI-RS, or SRS resource) indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

NR 5G wireless communication systems may support one or more frequency ranges, including FR1, FR2, a higher FR (e.g., FR4 or FR5), or a legacy LTE frequency range. For example, the LTE frequency range may include the E-UTRA frequency bands between 350 MHz and 3.8 GHz. In some examples, each cell may support a single frequency range (e.g., FR1, FR2, etc.) and may further support one or more frequency bands (e.g., carrier frequencies) within a particular frequency range. Each cell may further communicate with a UE using one or more sub-bands within the frequency band supported by the cell.

As indicated above, higher NR operating bands (e.g., FR2 or higher) may utilize larger subcarrier spacings (SCSs), which result in shorter symbol durations, thus increasing the UE complexity. In addition, since the receiver (Rx) at the UE may have different processing loads at different times (e.g., due to scheduling, the number of MIMO layers being utilized, and beam management (BM) procedures or other procedures being performed), the average complexity of the UE over time may vary. Furthermore, at higher NR operating bands with larger SCS, the scheduling may typically be cross-slot, since the DCI processing time may be in the order slots (e.g., due to the shorter symbols), which may further increase the UE complexity at the higher NR operating bands.

Figure 7:
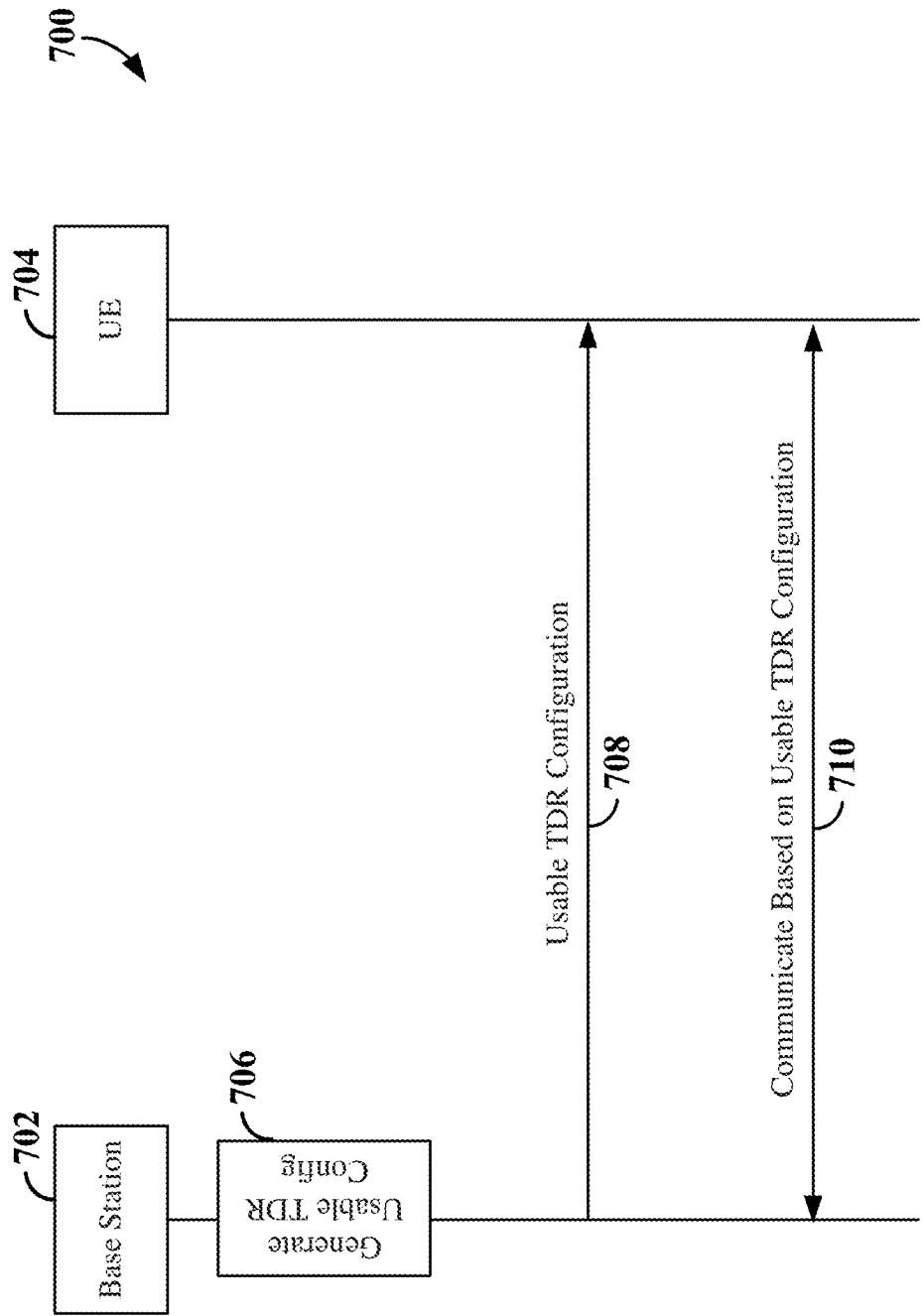
FIG. 7 is a diagram illustrating exemplary signaling for configuring intermittent time domain resources usable for communication between a base station and a user equipment (UE) according to some aspects.

Therefore, various aspects relate to adapting the time domain resources usable by the UE for downlink or uplink communications to reduce the average UE complexity. FIG. 7 illustrates exemplary signaling 700 for configuring intermittent time domain resources usable for communication between a radio access network (RAN) node (e.g., a base station) 702 and a user equipment (UE) 704 according to some aspects. The base station 702 may correspond to any of the base stations (e.g., gNBs) or other scheduling entities illustrated in any of FIGS. 1, 3, 5 and/or 6. In addition, the UE 704 may correspond to any of the UEs or other scheduled entities illustrated in any of FIGS. 1, 2, 5 and/or 6.

At 706, the base station 702 may generate a usable time domain resource (TDR) configuration for the UE 704. The usable TDR configuration may indicate usable time resources that are available to the UE 704 for communication with the base station 702. The usable time resources may correspond to intermittent time resources selected from a plurality of time resources. In some examples, the usable TDR configuration may have a time domain resource granularity. In some examples, the time domain resource granularity may be a symbol level granularity, a slot level granularity, or other suitable time domain resource granularity. For example, the usable time resources may correspond to one or more symbols of a slot or one or more slots in a subframe or frame. In addition, the usable TDR configuration may have a repeating configuration (e.g., repeats back-to-back in time) or may be aligned to a time domain resource boundary (e.g., slot, subframe, frame, etc.).

In some examples, the usable TDR configuration may include a reduction factor indicating the usable time resources. For example, the usable TDR configuration may have a reduction factor of N, meaning that every Nth resource is available or not available. In other examples, the usable TDR configuration may include a pattern mask indicating the usable time resources. For example, a pattern mask of 10011001 indicates time resources {0, 3, 4, and 7} are available or not available. The usable TDR configuration may further be based on other usable time domain resource identification mechanisms.

In some examples, the usable TDR configuration may be a universal configuration or may be associated with one or more of at least one transmission configuration indicator (TCI) state, at least one sub-band, at least one antenna panel on the UE, or a group of UEs including the UE. The preceding configurations are provided for exemplary and non-limiting purposes.

At 708, the base station 702 may transmit the usable TDR configuration to the UE 704 via downlink control information (DCI), a medium access control (MAC) control element (MAC-CE), or a radio resource control (RRC) message. For example, the base station 702 may semi-statically configure the UE 704 with the usable TDR configuration via RRC or may dynamically configure the UE 704 with the usable TDR configuration via DCI or MAC-CE.

At 710, the UE 704 and the base station 702 may communicate based on the usable TDR configuration. For example, the base station 702 may schedule a downlink or uplink communication with the UE 704 within the usable time resources and transmit scheduling information to the UE 704 indicating the scheduled time resources within the usable time resources allocated to the downlink or uplink communication. As another example, the usable TDR configuration may block out the first few symbols of each slot to prevent the UE 704 from monitoring for a PDCCH, thus preventing the UE 704 from receiving scheduling information for a downlink or uplink communication. In this example, the communication between the UE 704 and the base station 702 may be minimized (e.g., limited to previously semi-persistently or semi-statically scheduled communication).

Figure 8:
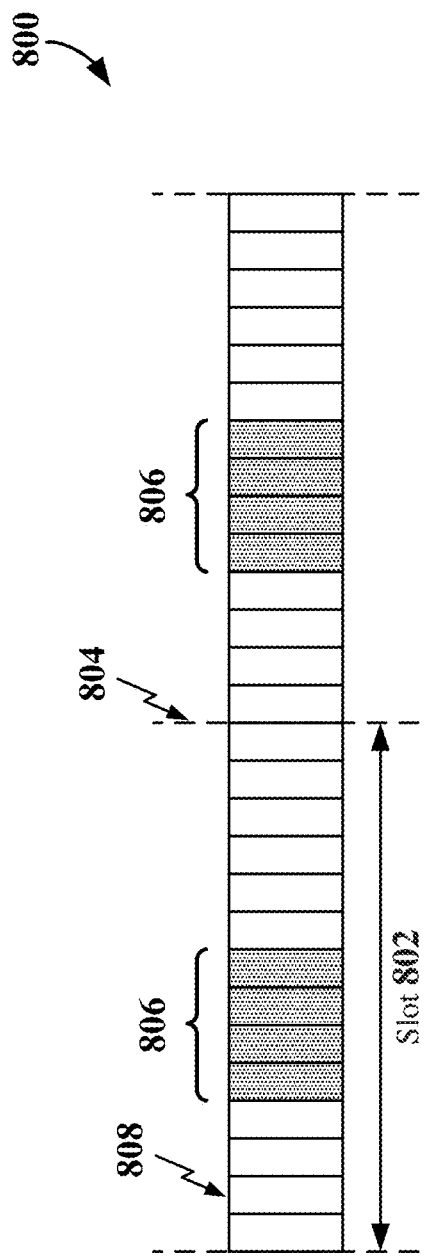
FIG. 8 is a diagram illustrating an exemplary usable time domain resource (TDR) configuration according to some aspects.

FIG. 8 is a diagram illustrating an exemplary usable time domain resource (TDR) configuration 800 according to some aspects. In the example shown in FIG. 8, the usable TDR configuration has a symbol-level granularity of usable time resources 806 configured for each slot 802 of a plurality of slots. In addition, the usable TDR configuration is aligned to a slot boundary 804 between slots 802 such that each slot 802 includes the same usable time resources 806.

Furthermore, the usage TDR configuration is configured as a pattern mask, where the pattern corresponds to {00001111000000}. Thus, each slot 802 includes usable time resources 806 corresponding to a number of consecutive symbols 808. Here, the usable time resources 806 that are available to the UE for communication with the base station include symbols 4-7 within each slot 802. As a result, symbols 0-3 and 8-13 are not available to the UE for communication with the base station. In the example shown in FIG. 8, the average load on the UE is reduced to 4 out of every 14 symbols, thus reducing the average UE complexity.

Figure 9:
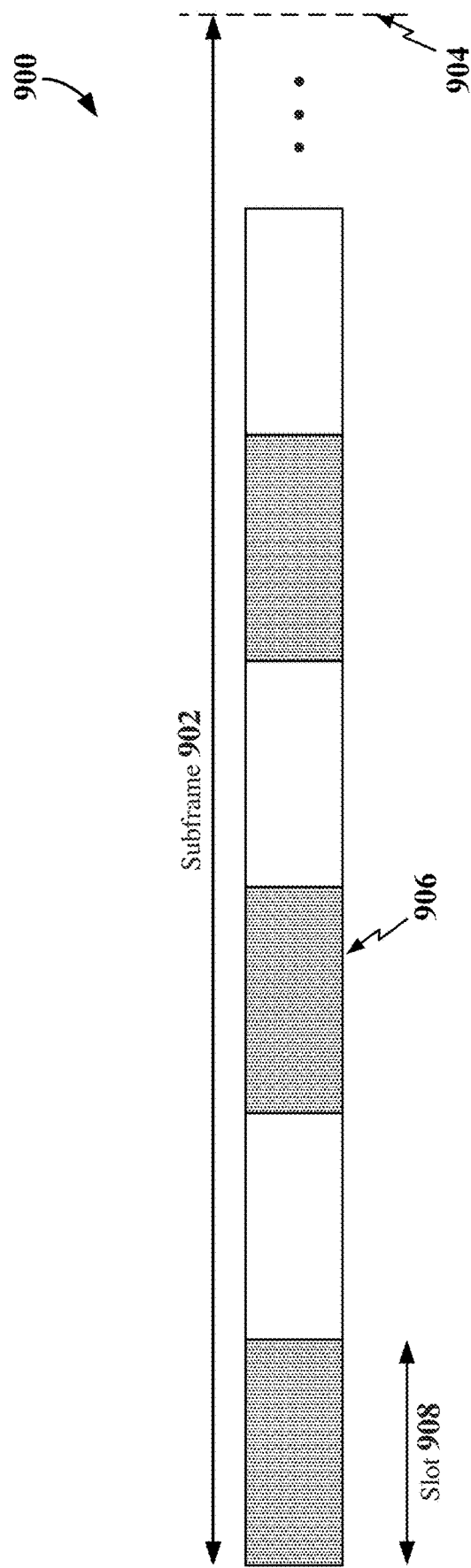
FIG. 9 is a diagram illustrating another exemplary usable TDR configuration according to some aspects.

FIG. 9 is a diagram illustrating another exemplary usable TDR configuration according to some aspects. In the example shown in FIG. 9, the usable TDR configuration has a slot-level granularity of usable time resources 906 configured for each subframe 902 of a plurality of subframes. In addition, the usable TDR configuration is aligned to a subframe boundary 904 between subframes 902 such that each subframe 902 includes the same usable time resources 906.

Furthermore, the usage TDR configuration is configured as a reduction factor, where the reduction factor=2. Thus, each subframe 902 includes usable time resources 906 corresponding to every other slot 908 within the subframe 902. Here, the usable time resources 906 that are available to the UE for communication with the base station include slots 0, 2, 4, . . . within each subframe 902. As a result, slots 1, 3, 5, . . . are not available to the UE for communication with the base station. In some examples, rate-matching of a PDSCH scheduled within one or more of the available slots may vary based on the configured time (k0) between receipt of the PDCCH scheduling a PDSCH and the PDSCH. In the example shown in FIG. 9, the average load on the UE is reduced to 1 out of every 2 slots, thus reducing the average UE complexity. In some examples, in the unavailable slots, the UE may enter a sleep state to reduce the power consumption by the UE.

Figure 10:
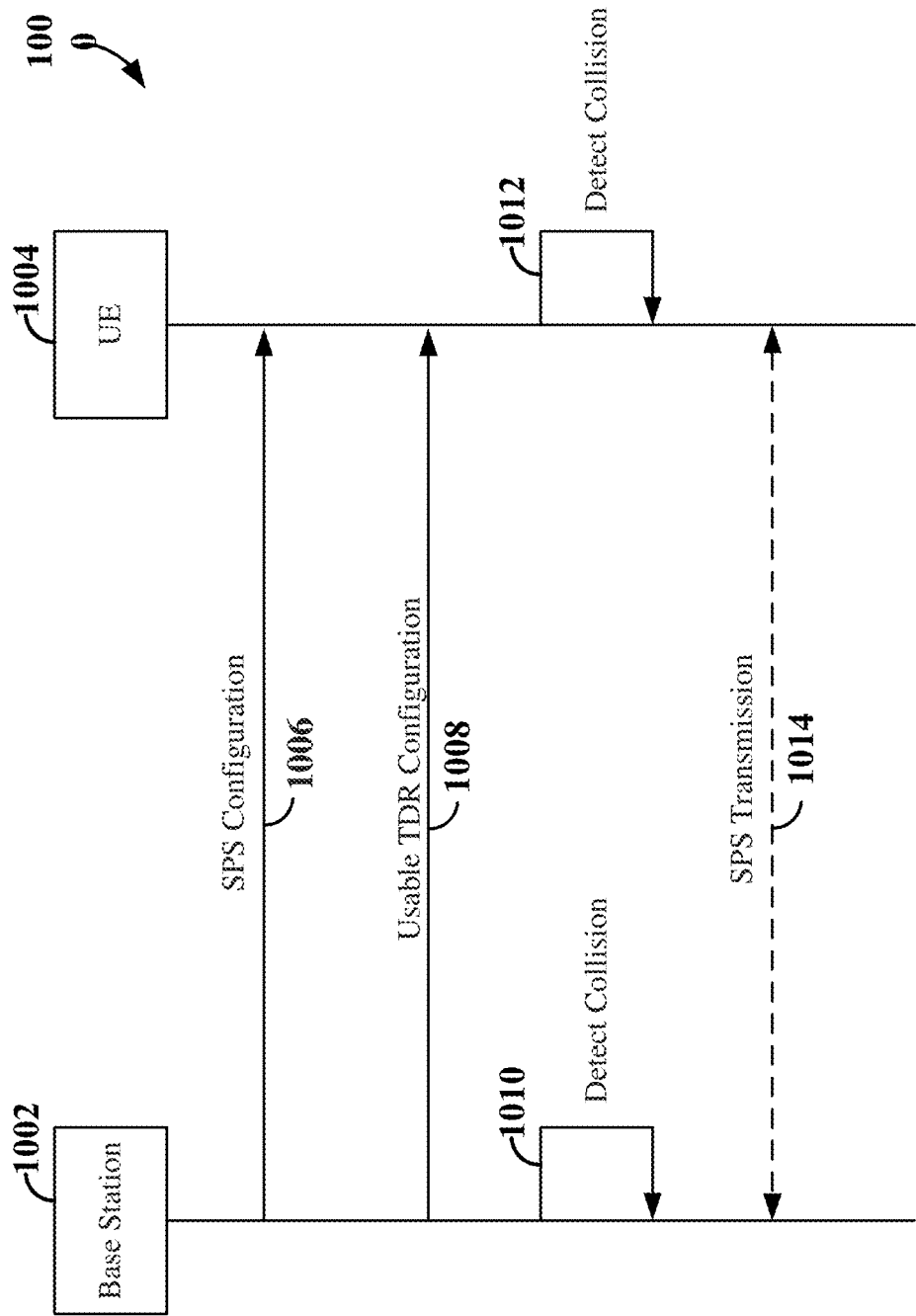
FIG. 10 is a diagram illustrating exemplary signaling for detecting a collision between a pre-scheduled transmission and a usable TDR configuration according to some aspects.

FIG. 10 is a diagram illustrating exemplary signaling for detecting a collision between a pre-scheduled transmission between a RAN node (e.g., a base station) 1002 and a UE 1004 and a usable TDR configuration according to some aspects. The base station 1002 may correspond to any of the base stations (e.g., gNBs) or other scheduling entities illustrated in any of FIGS. 1, 2, 5, 6, and/or 7. In addition, the UE 1004 may correspond to any of the UEs or other scheduled entities illustrated in any of FIGS. 1, 2, 5, 6 and/or 7.

At 1006, the base station 1002 may generate a semi-persistently scheduled (SPS) configuration for downlink or uplink transmissions and transmit the SPS configuration to the UE 1004. The SPS configuration may include, for example, an indication of the allocated resources for the SPS configuration, a semi-persistent scheduling identifier (e.g., an SPS-RNTI) for the UE 1004 and a periodicity (p) of the SPS configuration. Additional SPS configuration information may also include, but is not limited to, an implicit release time, cyclic shift DMRS configuration, modulation and coding scheme (MCS) and/or other parameters. For example, an SPS configuration may be configured with PDSCH SPS occasions of a periodicity p, which defines the duration of time between two consecutive PDSCH SPS occasions. On the uplink, an SPS resource may be referred to as a configured grant (CG). With CGs, just as with downlink SPS configurations, scheduling information corresponding to the uplink CG may be signaled just once to the UE. Subsequently, without needing to receive additional scheduling information, the UE may periodically utilize the semi-persistently allocated resources in the uplink CG. For simplicity, uplink CGs and downlink SPS configurations may be referred to herein as SPS configurations.

In some examples, the SPS configuration (e.g., the periodicity, SPS-RNTI, etc.) may be configured via a radio resource control (RRC) message and the allocated resources for the SPS configuration may be provided via DCI. Once configured, in order to begin using the SPS configuration, the base station 1002 may transmit an SPS activation message scrambled with the SPS-RNTI to the UE 1004 to activate the SPS configuration and enable the UE 1004 to utilize the SPS configuration. The SPS activation message may be transmitted, for example, via DCI within a PDCCH. In some examples, the SPS activation message may be transmitted within the same DCI as the allocated resources.

At 1008, the base station 1002 may generate and transmit a usable TDR configuration to the UE 1004. The usable TDR configuration indicates usable time resources that are available to the UE 1004 for communication with the base station 1002. For example, the usable TDR configuration may indicate one or more symbols of a slot or one or more slots of a subframe or frame that are available to the UE 1004 for communication with the base station 1002.

At 1010, the base station 1002 may detect a collision between the SPS configuration and the usable TDR configuration. Similarly, at 1012, the UE 1004 may detect a collision between the SPS configuration and the usable TDR configuration. For example, the base station 1002 and UE 1004 may each identify a first set of time resources outside of the usable time resources indicated by the usable TDR configuration. Thus, the first set of time resources may correspond to the unusable time resources that are not available to the UE 1004 for communication with the base station 1002. In addition, the base station 1002 and UE 1004 may each identify a second set of time resources of the plurality of time resources pre-scheduled for a transmission between the UE 1004 and the base station 1002 based on the SPS configuration. Thus, the second set of time resources correspond to the time resources on which an SPS communication is scheduled. The base station 1002 and UE 1004 may each then identify overlapping time resources between the first set of time resources and the second set of time resources. The overlapping time resources correspond to colliding time resources between the unusable time resources and the SPS resources.

At 1014, the base station 1002 and UE 1004 may selectively communicate the SPS transmission based on the detected collision. In some examples, the entire SPS transmission may be dropped (e.g., the SPS transmission is not communicated between the base station 1002 and UE 1004). In other examples, the usable TDR configuration may be ignored for the SPS occasion. In this example, the SPS transmission is communicated between the UE 1004 and the base station 1002 utilizing all of the second set of time resources. In other examples, the SPS transmission may be rate-matched around the overlapping time resources and communicated between the UE 1004 and the base station 1002. In this example, the overlapping time resources are not utilized for the SPS transmission.

Figure 11:
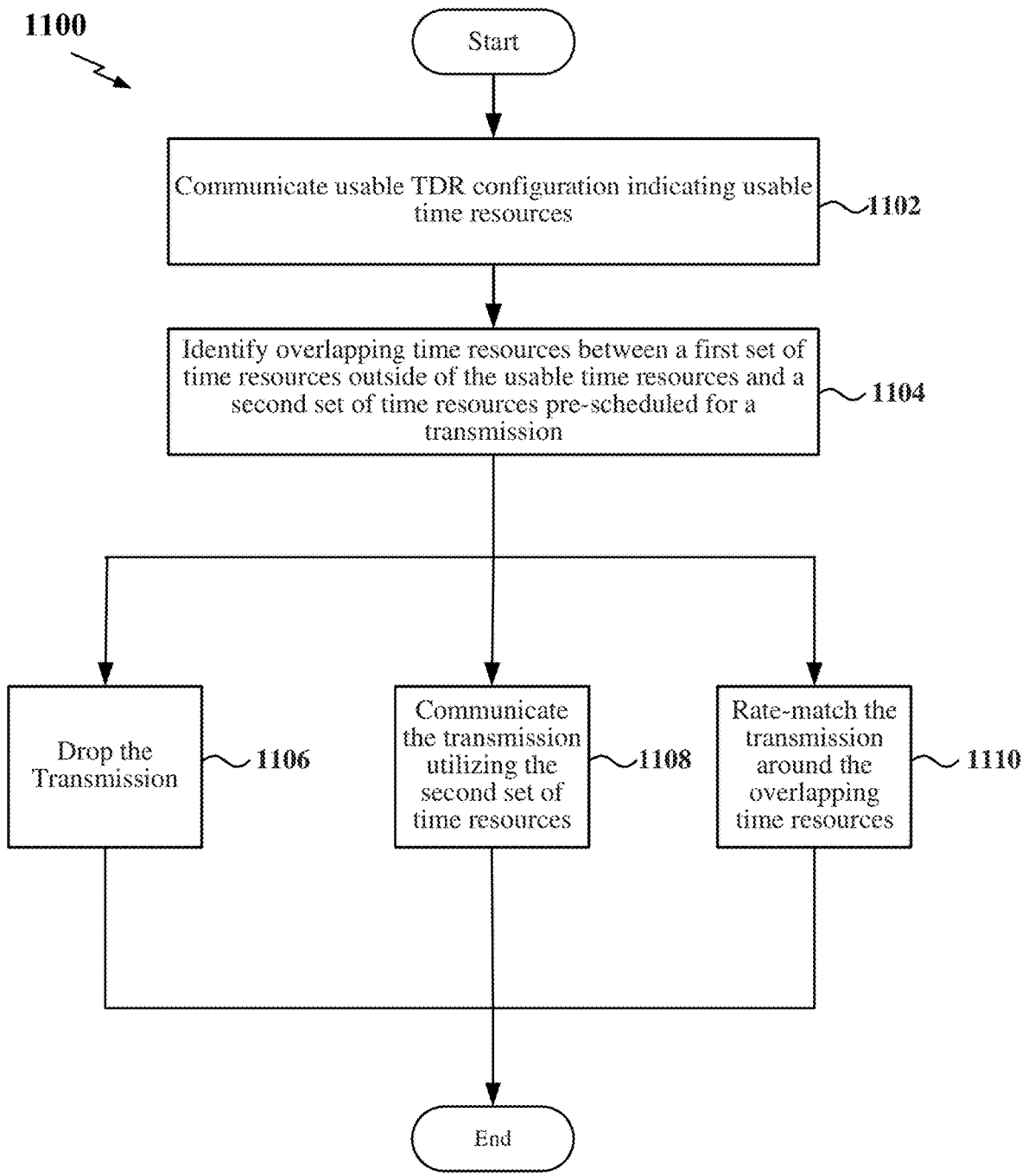
FIG. 11 is a flow chart illustrating an exemplary process for interworking between a pre-scheduled transmission and a usable TDR configuration according to some aspects.

FIG. 11 is a flow chart illustrating an exemplary process 1100 for interworking between a pre-scheduled transmission and a usable TDR configuration according to some aspects. As described below, some or all illustrated features may be omitted in a particular implementation within the scope of the present disclosure, and some illustrated features may not be required for implementation of all examples. In some examples, the process 1100 may be carried out by the UE 2100 illustrated in FIG. 21 or the RAN node 1900 illustrated in FIG. 19. In some examples, the process 1100 may be carried out by any suitable apparatus or means for carrying out the functions or algorithm described below.

At block 1102, an apparatus (e.g., a UE or base station) may communicate a usable TDR configuration indicating usable time resources of a plurality of time resources that are available to the UE for communication with the base station. In examples in which the apparatus is a base station, the base station may generate and transmit the usable TDR configuration to the UE. In examples in which the apparatus is a UE, the UE may receive the usable TDR configuration from the base station. For example, the usable TDR configuration may be communicated via DCI, a MAC-CE, or an RRC message.

At block 1104, the apparatus may identify overlapping time resources between a first set of time resources outside of the usable time resources and a second set of time resources pre-scheduled for a transmission. The pre-scheduled transmission may be an SPS or other periodic transmission. For example, the second set of time resources may be associated with an SPS configuration of the pre-scheduled transmission. In some examples, the pre-scheduled transmission may include a pre-scheduled downlink or uplink transmission, such as PDSCH, a PUSCH, or other downlink or uplink channel or signal.

Based on the identified overlapping time resources, the apparatus may take one of a plurality of different actions with respect to the pre-scheduled transmission. Examples of actions are illustrated at blocks 1106, 1108, and 1110. These actions are merely exemplary, and the present disclosure is not limited to the actions shown in FIG. 11.

For example, at block 1106, the apparatus may drop the pre-scheduled transmission. In this example, the apparatus may drop the SPS occasion associated with the pre-scheduled transmission, such that the pre-scheduled transmission is not transmitted. Subsequent SPS transmissions may occur though if the subsequent SPS transmission does not collide with the unavailable time resources indicated by the usable TDR configuration. As another example, at block 1108, the apparatus may communicate the pre-scheduled transmission utilizing the second set of time resources. In this example, the apparatus may ignore the usable TDR configuration for the SPS occasion to enable the pre-scheduled transmission to occur over all of the second set of time resources. As another example, at block 1110, the apparatus may rate-match the pre-scheduled transmission around the overlapping time resources. In this example, the apparatus may communicate the pre-scheduled transmission within the second set of time resources excluding the overlapping time resources.

In some examples, the apparatus may be pre-configured to perform one of the actions. For example, the apparatus may be pre-configured by the original equipment manufacturer (e.g., based on one or more NR standards or specifications) or the base station may select the action and configure the UE with the action. In some examples, the apparatus may select one of the actions based on the amount of overlapping time resources. For example, the apparatus may select block 1110 in response to a ratio of a first amount of overlapping time resources (e.g., in numbers of symbols) to a second amount of the second set of time resources (e.g., in numbers of symbols) being less than a threshold and block 1106 or 1108 in response to the ratio being greater than the threshold.

Figure 12:
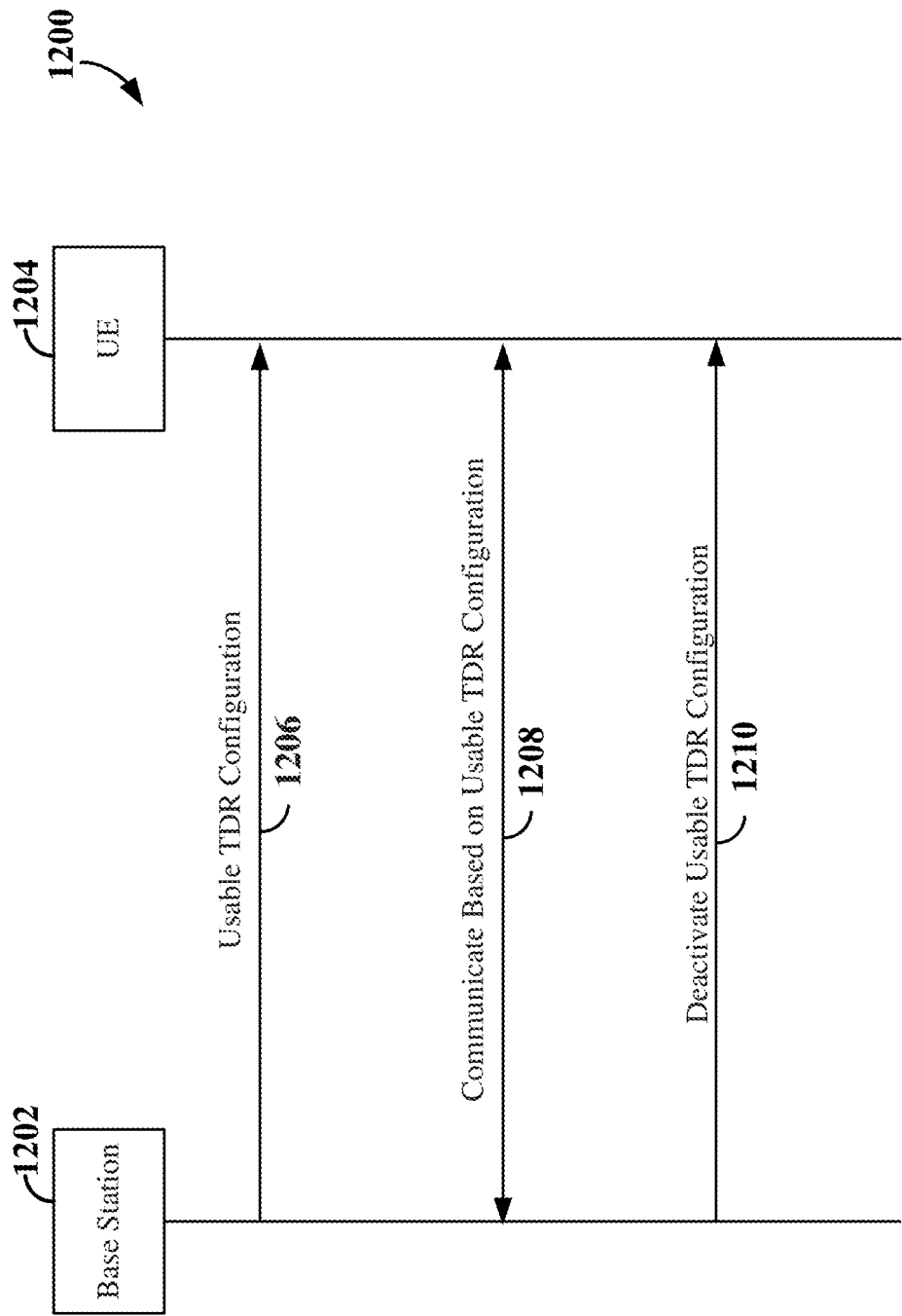
FIG. 12 is a diagram illustrating exemplary signaling for deactivating a usable TDR configuration according to some aspects.

FIG. 12 is a diagram illustrating exemplary signaling between a RAN node (e.g., a base station) 1202 and a UE 1204 for deactivating a usable TDR configuration according to some aspects. The base station 1202 may correspond to any of the base stations (e.g., gNBs) or other scheduling entities illustrated in any of FIGS. 1, 2, 5, 6, 7, and/or 10. In addition, the UE 1204 may correspond to any of the UEs or other scheduled entities illustrated in any of FIGS. 1, 2, 5, 6, 7 and/or 10.

At 1206, the base station 1202 may generate and transmit a usable TDR configuration to the UE 1204. The usable TDR configuration indicates usable time resources that are available to the UE 1204 for communication with the base station 1202. For example, the usable TDR configuration may indicate one or more symbols of a slot or one or more slots of a subframe or frame that are available to the UE 1204 to communicate with the base station 1202.

At 1208, the base station 1202 and the UE 1204 may communicate utilizing the usable time resources indicated by the usable TDR configuration. For example, the base station 1202 and UE 1204 may communicate one or more uplink or downlink transmissions utilizing at least a portion of the usable time resources of the usable TDR configuration.

At 1210, the base station 1202 may deactivate the usable TDR configuration. For example, the base station 1202 may transmit a deactivation message to the UE 1204 to deactivate the usable TDR configuration. Upon deactivation, the base station 1202 and UE 1204 may utilize any time resource for communication therebetween.

Figure 13:
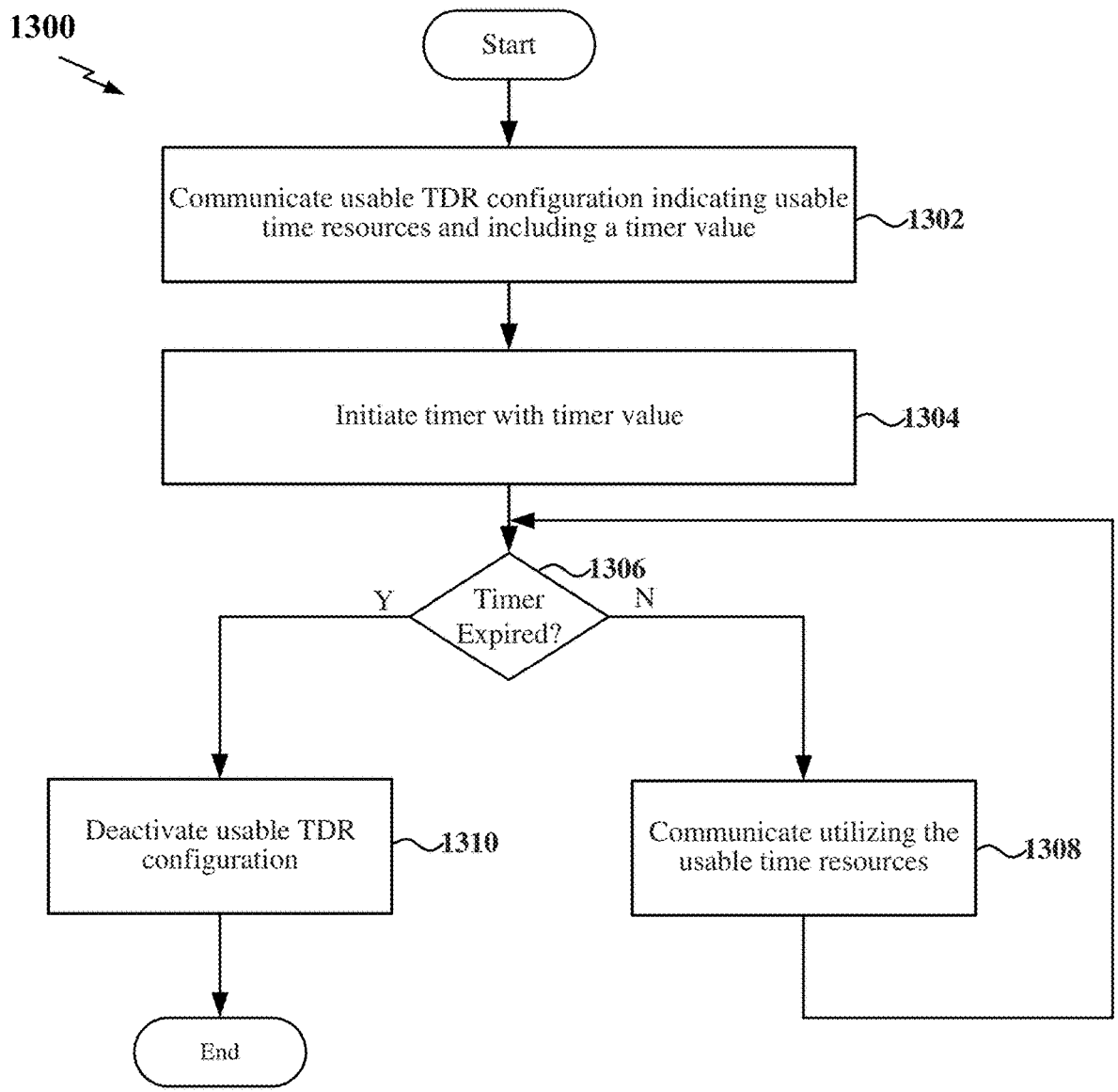
FIG. 13 is a flow chart illustrating an exemplary process for timer-based deactivation of a usable TDR configuration according to some aspects.

FIG. 13 is a flow chart illustrating an exemplary process 1300 for timer-based deactivation of a usable TDR configuration according to some aspects. As described below, some or all illustrated features may be omitted in a particular implementation within the scope of the present disclosure, and some illustrated features may not be required for implementation of all examples. In some examples, the process 1300 may be carried out by the UE 2100 illustrated in FIG. 21 or the RAN node 1900 illustrated in FIG. 19. In some examples, the process 1300 may be carried out by any suitable apparatus or means for carrying out the functions or algorithm described below.

At block 1302, an apparatus (e.g., a UE or base station) may communicate a usable TDR configuration indicating usable time resources that are available to the UE for communication with the base station. The usable TDR configuration may further include a timer value associated with the usable TDR configuration. In examples in which the apparatus is a base station, the base station may generate and transmit the usable TDR configuration including the timer value to the UE. In examples in which the apparatus is a UE, the UE may receive the usable TDR configuration including the timer value from the base station. For example, the usable TDR configuration including the timer value may be communicated via DCI, a MAC-CE, or an RRC message.

At block 1304, the apparatus may initiate a timer with the timer value. At block 1306, the apparatus may determine whether the timer has expired. If the timer has not expired (N branch of block 1306), at block 1308, the apparatus may communicate utilizing the usable time resources indicated by the usable TDR configuration. For example, the apparatus may communicate downlink or uplink channels or signals using only the usable time resources. If the timer has expired (Y branch of block 1306), at block 1310, the apparatus may deactivate the usable TDR configuration. Upon deactivation, the apparatus may communicate using any time resource (e.g., the apparatus is not limited to the usable time resources).

Figure 14A:
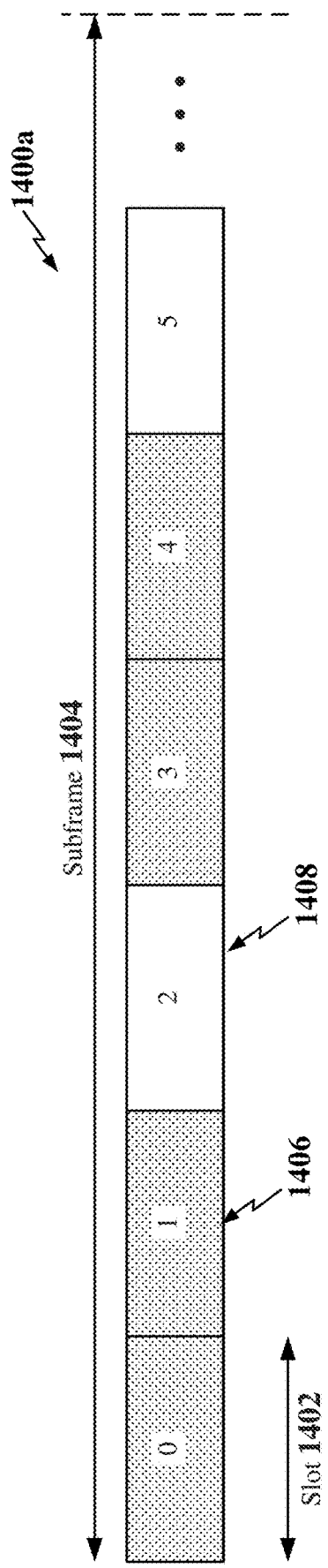
FIGS. 14A and 14B are diagrams illustrating exemplary time domain resource numbering schemes according to some aspects.
Figure 14B:
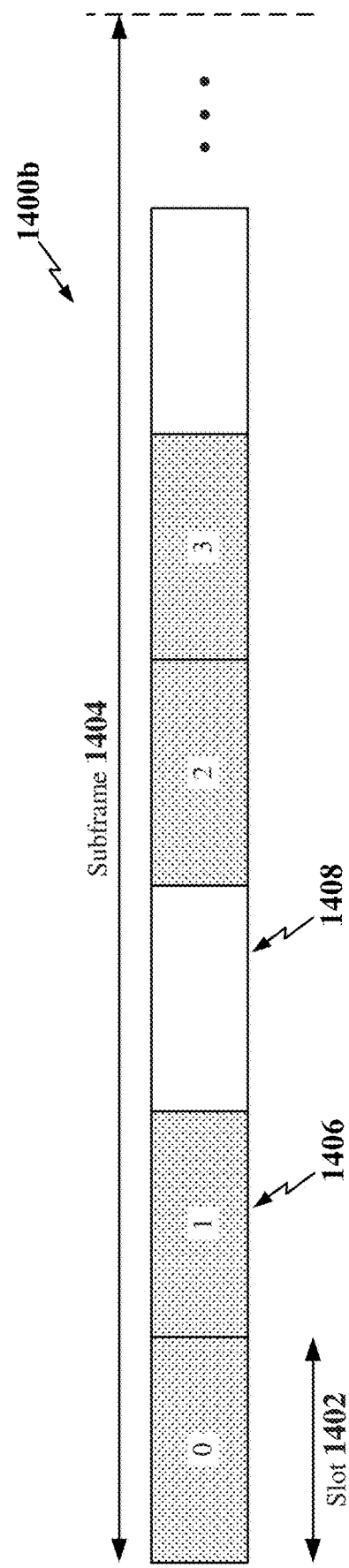

FIGS. 14A and 14B are diagrams illustrating exemplary time domain resource numbering schemes 1400a and 1400b according to some aspects. The time domain resource numbering schemes 1400a and 1400b are based on a slot-level granularity. Thus, each time domain resource shown in FIGS. 14A and 14B corresponds to a slot 1402 of a subframe 1404. Similar time domain resource numbering schemes may also be applied to other time domain resource granularities, such as symbol-level granularities. The symbol-level or slot-level time domain resource numbering scheme may be used, for example, for time domain resource allocation, HARQ, and other suitable time domain resource numbering purposes.

In the example shown in FIG. 14A, the time domain resource numbering scheme 1400a is based on all of the slots 1402 in the subframe 1404 (or similarly, all of the symbols of a slot). Thus, each slot 1402 in the subframe 1404, including both usable slots 1406 and unusable slots 1408, is numbered consecutively (e.g., slots 0-5). The usable slots 1406 correspond to the usable time resources indicated by the usable TDR configuration, whereas the unusable slots 1408 are the unusable time resources indicated by the usable TDR configuration. The time domain resource numbering scheme 1400a shown in FIG. 14A corresponds to a conventional time domain resource numbering scheme 1400a, and as such, scheduling of downlink or uplink transmissions and HARQ feedback timing may occur without modification of existing scheduling mechanisms.

In the example shown in FIG. 14B, the time domain resource numbering scheme 1400b is based on the usable slots 1406 in the subframe. In this example, the unusable slots 1408 are skipped and not numbered. Thus, each of the usable slots 1406 in the subframe 1404 is numbered consecutively (e.g., slots 0-3) and the unusable slots 1408 are not numbered. In some examples, the base station may schedule downlink and uplink communications using a slot offset, k0 or k2, based on the time domain resource numbering scheme 1400b. Here, k0 refers to the offset between the slot containing the PDCCH scheduling a PDSCH and the slot containing the PDSCH, and k2 is the offset between the slot containing the PDSCH scheduling a PUSCH and the slot containing the PUSCH. For example, if slot 0 contains a PDCCH scheduling a PDSCH in slot 2, k0 may be set equal to two based on the time domain resource numbering scheme 1400b. In other examples, the base station may schedule downlink and uplink communications using a k0 or k2 based on the original (conventional) time domain resource numbering scheme 1400a. Using the same example with slot 0 containing the PDCCH and slot 2 containing the PDSCH, the base station may set k0 equal to three. In this example, the UE may modify the k0 sent by the base station from three to two based on the time domain resource numbering scheme 1400b.

In addition, the HARQ timing indicator, k1, may further be set based on the time domain resource numbering scheme 1400*b*. Here, k1 refers to the offset between the slot containing the PDSCH and the slot where the HARQ feedback (e.g., ACK/NACK) is scheduled for the PDSCH. For example, if slot 1 contains a PDSCH and k1 is set equal to two, the UE may transmit the HARQ feedback for the PDSCH in slot 3 based on the time domain resource numbering scheme 1400*b*. In other examples, the base station may set k1 based on the original (conventional) time domain resource numbering scheme 1400*a*. Using the same example with slot 1 containing the PDSCH, the base station may set k1 equal to three. In this example, the UE may modify the k1 sent by the base station from three to two based on the time domain resource numbering scheme 1400*b*.

Figure 15:
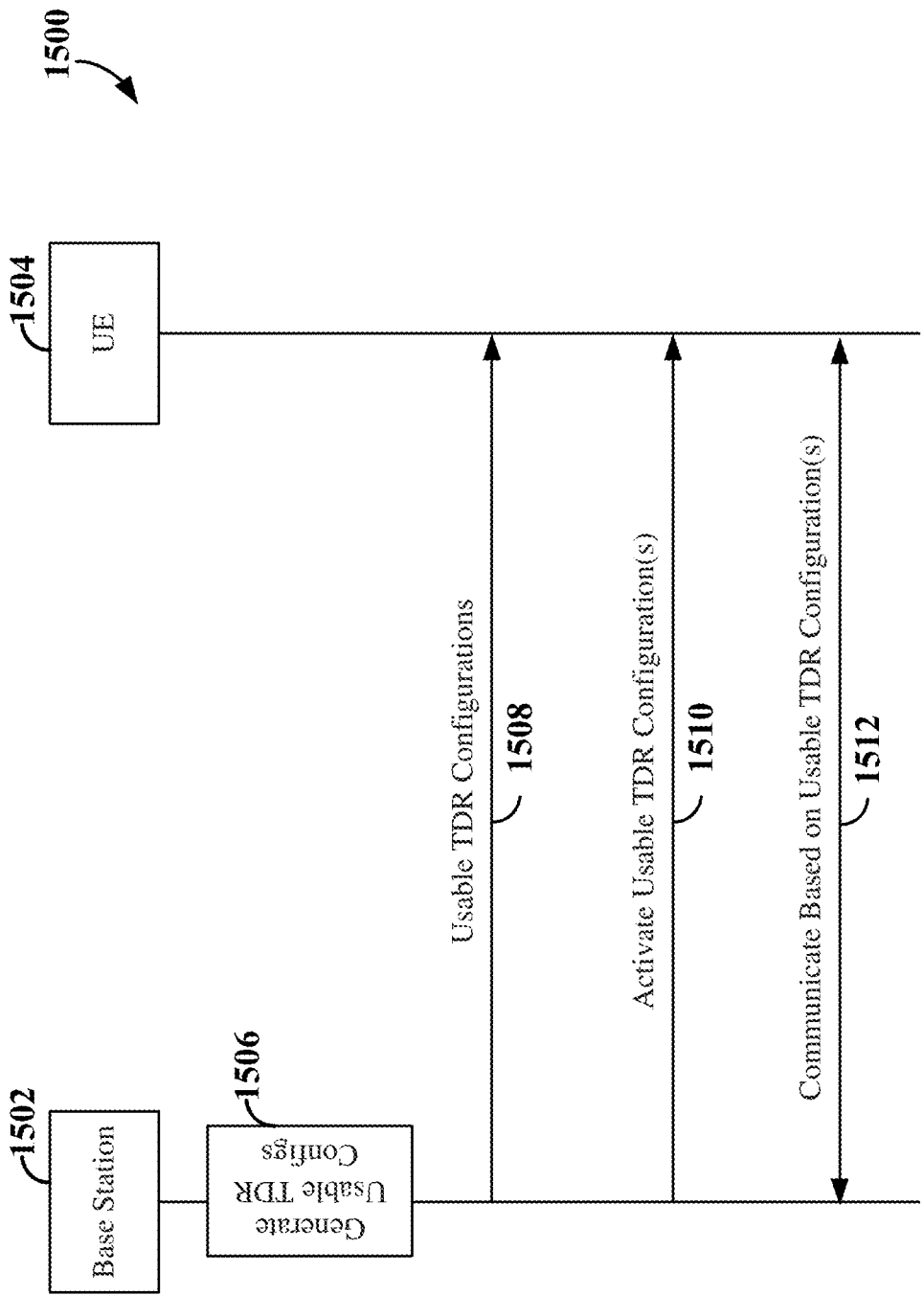
FIG. 15 is a diagram illustrating exemplary signaling for configuring a UE with a usable TDR configuration according to some aspects.

FIG. 15 is a diagram illustrating exemplary signaling between a RAN node (e.g., a base station) 1502 and a UE 1504 for configuring the UE 1504 with a usable TDR configuration according to some aspects. The base station 1502 may correspond to any of the base stations (e.g., gNBs) or other scheduling entities illustrated in any of FIGS. 1, 2, 5-7, 10, and/or 12. In addition, the UE 1504 may correspond to any of the UEs or other scheduled entities illustrated in any of FIGS. 1, 2, 5-7, 10, and/or 12.

At 1506, the base station 1502 may generate a plurality of usable TDR configurations for the UE. Each usable TDR configuration may have a respective time domain resource granularity and may be based on a respective usable time domain resource identification mechanism. In addition, each of the plurality of usable TDR configurations may be repeating or may be aligned to a time domain resource boundary. Furthermore, each of the plurality of usable TDR configurations may be a universal configuration or a separate configuration applied to one or more TCI states, one or more sub-bands, one or more antenna panels on the UE, and/or a group of UEs including the UE.

At 1508, the base station 1502 may transmit the plurality of usable TDR configurations to the UE 1504. For example, the plurality of usable TDR configurations may be transmitted to the UE 1504 via RRC signaling. In some examples, each of the plurality of usable TDR configurations may be associated with a codepoint. For example, each codepoint may represent one or more usable TDR configurations. In this example, the base station 1502 may further transmit the list of codepoints and associated usable TDR configurations to the UE 1504.

At 1510, the base station 1502 may transmit an activation message to activate at least one of the plurality of usable TDR configurations. For example, the activation message may be transmitted to the UE 1504 via a MAC-CE or DCI. In some examples, the activation message includes a codepoint to activate one or more of the usable TDR configurations.

At 1512, the base station 1502 and UE 1504 may communicate utilizing the usable time resources indicated by the one or more activated usable TDR configurations. For example, the base station 1502 and UE 1504 may communicate one or more uplink or downlink transmissions utilizing at least a portion of the usable time resources of the activated usable TDR configuration(s).

Figure 16:
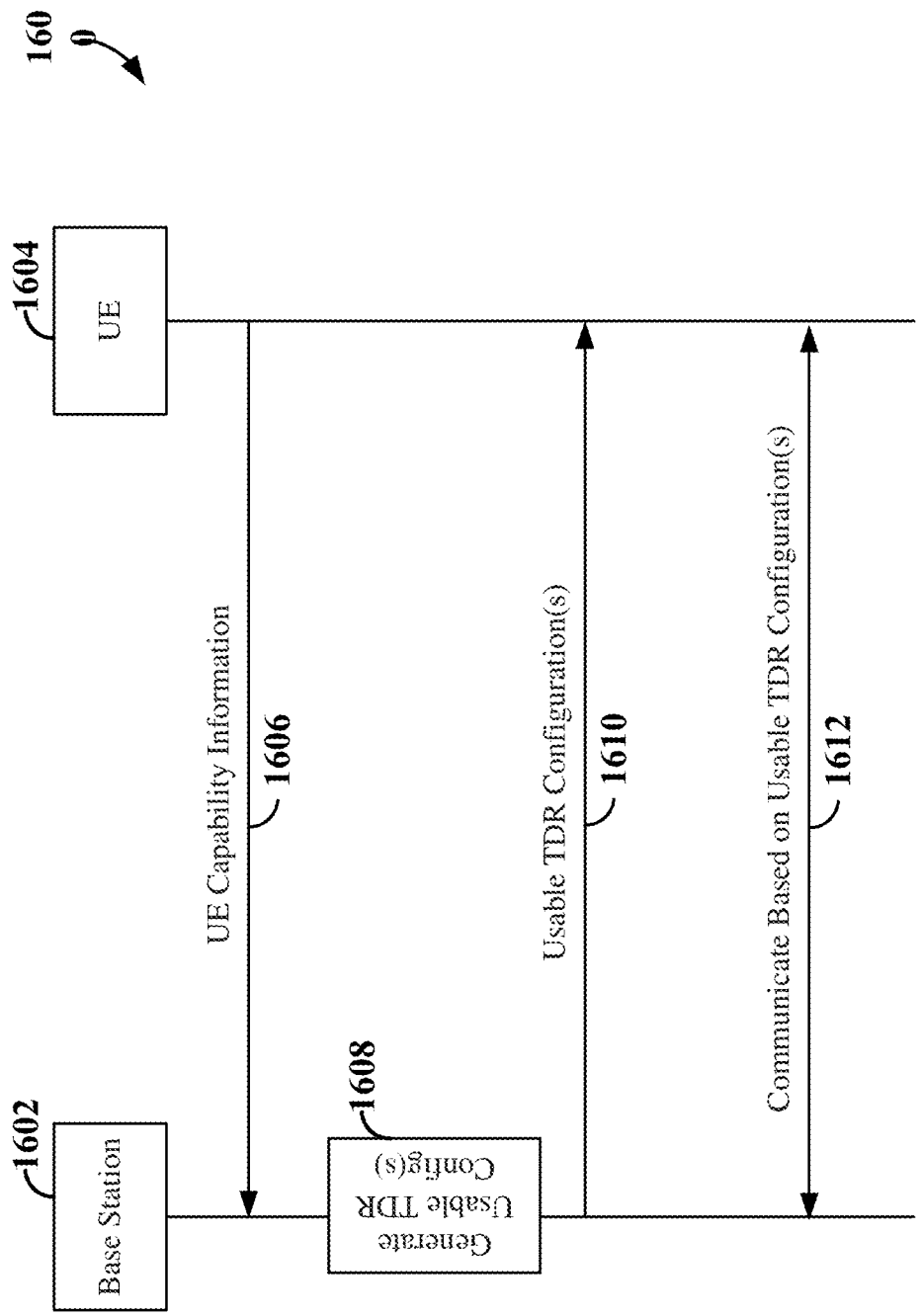
FIG. 16 is a diagram illustrating exemplary signaling for generating a usable TDR configuration according to some aspects.

FIG. 16 is a diagram illustrating exemplary signaling between a RAN node (e.g., a base station) 1602 and a UE 1604 for generating a usable TDR configuration according to some aspects. The base station 1602 may correspond to any of the base stations (e.g., gNBs) or other scheduling entities illustrated in any of FIGS. 1, 2, 5-7, 10, 12 and/or 15.

In addition, the UE 1604 may correspond to any of the UEs or other scheduled entities illustrated in any of FIGS. 1, 2, 5-7, 10, 12 and/or 15.

At 1606, the UE 1604 may transmit a UE capability information message to the base station 1602 indicating one or more capabilities of the UE. For example, the UE capability information message may be transmitted to the base station 1602 via an RRC message during initial registration of the UE 1604. The UE capabilities information message may indicate, for example, whether the UE supports both FDD and TDD, whether the UE supports both FR1 and FR2, whether the UE supports a long and/or short discontinuous reception (DRX) cycle, whether the UE supports more than one configured grant (CG) in a cell group, the frequency bands supported by the UE, the maximum number of component carriers supported by the UE, beam management capabilities of the UE, the maximum number of TCI states per component carrier supported by the UE, numerologies supported by the UE, and other suitable UE capability parameters.

At 1608, the base station 1602 may generate a usable TDR configuration for the UE 1604 based on the UE capability information message. For example, the base station 1602 may generate the usable TDR configuration based on at least one of the capabilities of the UE. For example, the base station 1602 may generate the usable TDR configuration based on the duplex mode(s) (FDD/TDD) supported, frequency ranges (FR1/FR2) supported, frequency bands supported, DRX cycles supported, maximum number of TCI states supported, number of CGs supported, beam management capabilities, numerologies supported, and/or other suitable capabilities of the UE. The usable TDR configuration may indicate usable time resources of a plurality of time resources that are available to the UE to communicate with the base station 1602. In some examples, the base station 1602 may generate a plurality of usable TDR configurations for the UE 1604 and then select one or more of the plurality of usable TDR configurations based on the UE capabilities.

For example, the generated and/or selected usable TDR configuration(s) may have a time domain resource granularity or usable time domain resource identification mechanism based on the UE capabilities. In addition, the usable TDR configuration(s) may be repeating or may be aligned to a time domain resource boundary based on the UE capabilities. Furthermore, the usable TDR configuration(s) may be universal configuration(s) or applicable to one or more TCI states, one or more sub-bands, one or more antenna panels on the UE, and/or a group of UEs including the UE based on the UE capabilities.

At 1610, the base station 1602 may transmit the usable TDR configuration(s) to the UE 1604. For example, the usable TDR configuration(s) may be transmitted to the UE 1604 via one or more of DCI, a MAC-CE, or an RRC message. In some examples, the base station 1602 may transmit the usable TDR configuration(s) generated for the UE 1604 based on the UE capabilities via DCI, a MAC-CE, or an RRC message. In other examples, the base station 1602 may transmit a plurality of usable TDR configurations generated for the UE 1604 via an RRC message and then activate one or more of the usable TDR configurations selected based on the UE capabilities via DCI or MAC-CE.

At 1612, the base station 1602 and UE 1604 may communicate utilizing the usable time resources indicated by the usable TDR configuration(s) generated and/or selected based on the UE capabilities. For example, the base station 1602 and UE 1604 may communicate one or more uplink or downlink transmissions utilizing at least a portion of the usable time resources of the usable TDR configuration(s).

Figure 17:
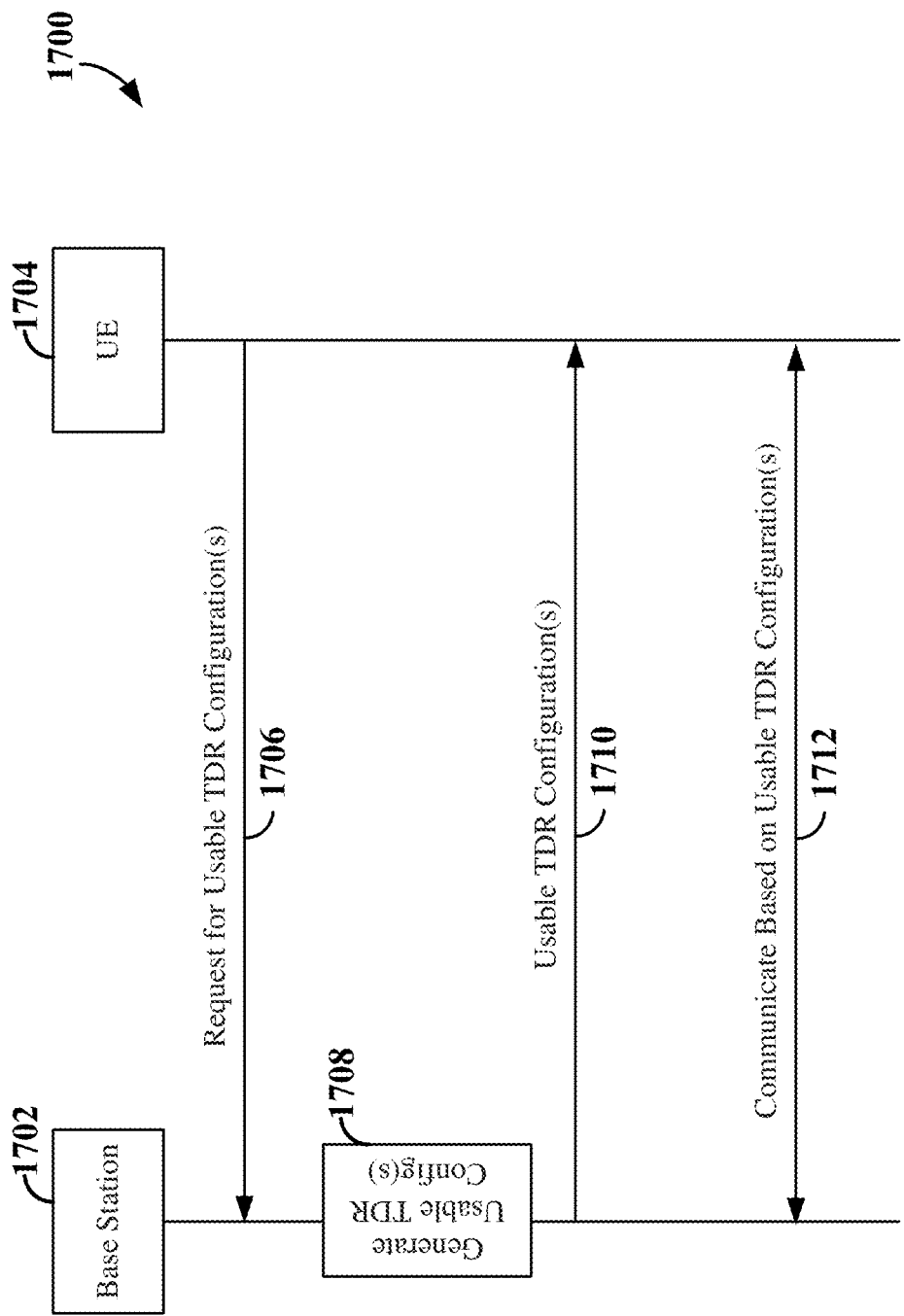
FIG. 17 is a diagram illustrating other exemplary signaling for generating a usable TDR configuration according to some aspects.

FIG. 17 is a diagram illustrating other exemplary signaling between a RAN node (e.g., a base station) 1702 and a UE 1704 for generating a usable TDR configuration according to some aspects. The base station 1702 may correspond to any of the base stations (e.g., gNBs) or other scheduling entities illustrated in any of FIGS. 1, 2, 5-7, 10, 12, 15 and/or 16. In addition, the UE 1704 may correspond to any of the UEs or other scheduled entities illustrated in any of FIGS. 1, 2, 5-7, 10, 12, 15 and/or 16.

At 1706, the UE 1704 may transmit a request for one or more usable TDR configurations to the base station 1702. In some examples, the request may be based on one or more rules configured on the UE. For example, the rules may be pre-configured (e.g., by the OEM based on one or more NR standards or specifications) or may be transmitted to the UE 1704 from the base station 1702. In some examples, the one or more rules may include one or more metrics, thresholds, or other assistance information utilized by the UE 1704 to identify one or more usable TDR configurations that may be requested. In some examples, the assistance information may be associated with an antenna panel or group of antenna panels on the UE.

In some examples, the assistance information may include a plurality of usable TDR configurations from which the UE can select. For example, the plurality of usable TDR configurations may be usable TDR configurations available in the cell or pre-generated for the UE 1704 by the base station 1702. For example, each of the plurality of usable TDR configurations may have a respective time domain resource granularity or be based on a respective usable time domain resource identification mechanism. In addition, each of the plurality of usable TDR configurations may be repeating or may be aligned to a time domain resource boundary. Furthermore, each of the plurality of usable TDR configurations may be universal configurations or may be applicable to one or more TCI states, one or more sub-bands, one or more antenna panels on the UE, and/or a group of UEs including the UE. The UE 1704 may then select one or more usable TDR configurations from the plurality of usable TDR configurations based on the one or more rules, and transmit the request for the selected usable TDR configuration(s) to the base station 1702.

At 1708, the base station 1702 may generate the usable TDR configuration(s) for the UE 1704 based on the request. For example, the base station 1702 may generate the usable TDR configuration(s) that correspond to the requested usable TDR configuration(s) or may generate different usable TDR configuration(s) based on to the requested usable TDR configuration(s). At 1710, the base station 1702 may transmit the generated/selected usable TDR configuration(s) to the UE 1704. For example, the generated/selected usable TDR configuration(s) may be transmitted to the UE 1704 via on or more of DCI, a MAC-CE, or an RRC message.

At 1712, the base station 1702 and UE 1704 may communicate utilizing the usable time resources indicated by the usable TDR configuration(s) generated and/or selected based on the UE request. For example, the base station 1702 and UE 1704 may communicate one or more uplink or downlink transmissions utilizing at least a portion of the usable time resources of the usable TDR configuration(s).

Figure 18:
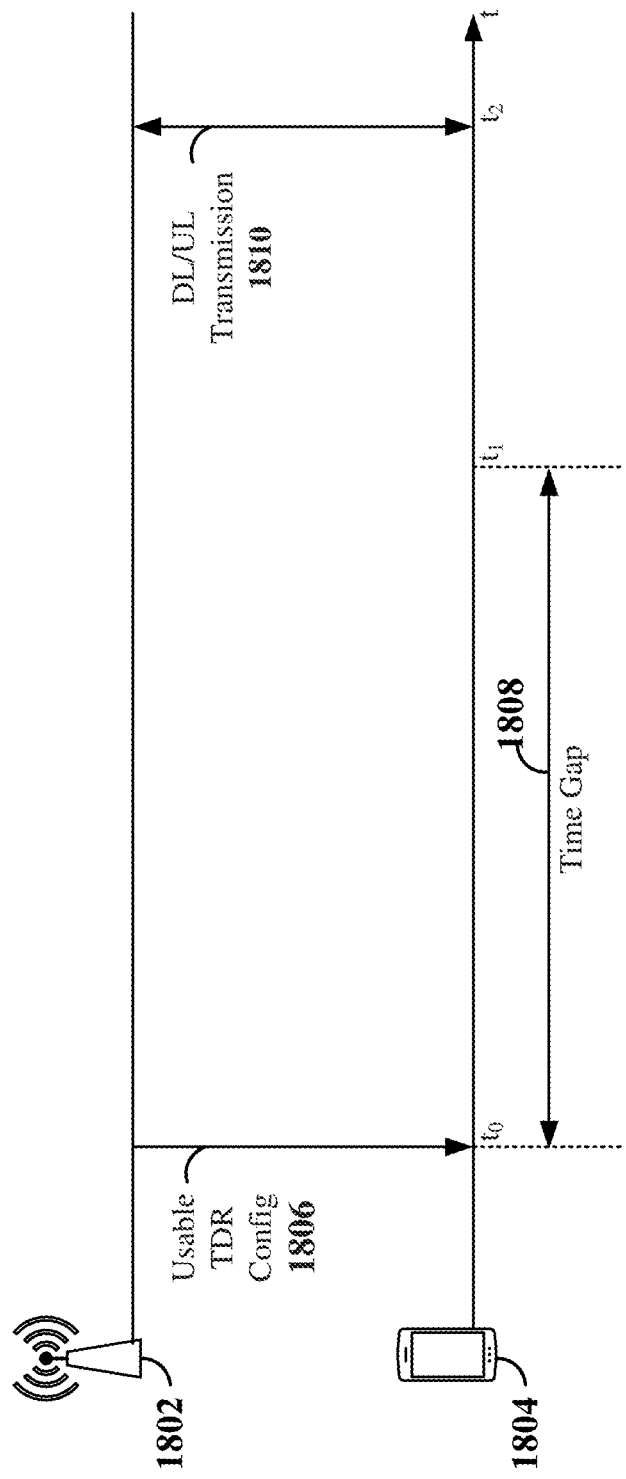
FIG. 18 is a diagram illustrating an exemplary initialization of a usable TDR configuration according to some aspects.

FIG. 18 is a diagram illustrating an exemplary initialization of a usable TDR configuration between a RAN node (e.g., a base station) 1802 and a UE 1804 according to some aspects. The base station 1802 may correspond to any of the base stations (e.g., gNBs) or other scheduling entities illustrated in any of FIGS. 1, 2, 5-7, 10, 12, and/or 15-17. In addition, the UE 1804 may correspond to any of the UEs or other scheduled entities illustrated in any of FIGS. 1, 2, 5-7, 10, 12, and/or 15-17.

In the example shown in FIG. 18, the base station 1802 may transmit a usable TDR configuration 1806 to the UE 1804 at an initial time to. The usable TDR configuration 1806 may be associated with an initialization time thereof. The initialization time indicates a time at which the UE 1804 and base station 1802 may apply (e.g., begin utilizing) the usable TDR configuration. For example, as shown in FIG. 18, the initialization time may occur at a time ti after a time gap 1808 between transmission or reception of the usable TDR configuration 1806 and initialization of the usable TDR configuration 1806. In some examples, the time gap 1808 may be included in the usable TDR configuration 1806. In other examples, the time gap 1808 may be pre-configured on the UE (e.g., by the OEM based on one or more NR standards or specifications) or signaled by the base station 1802 separately from the usable TDR configuration 1806.

After initialization of the usable TDR configuration 1806 at the initialization time ti, the UE 1804 and base station 1802 may communicate a downlink (DL) or uplink (UL) transmission therebetween based on the usable TDR configuration 1806. For example, the base station 1802 and UE 1804 may communicate the DL/UL transmission 1810 utilizing at least a portion of the usable time resources of the usable TDR configuration 1806.

Figure 19:
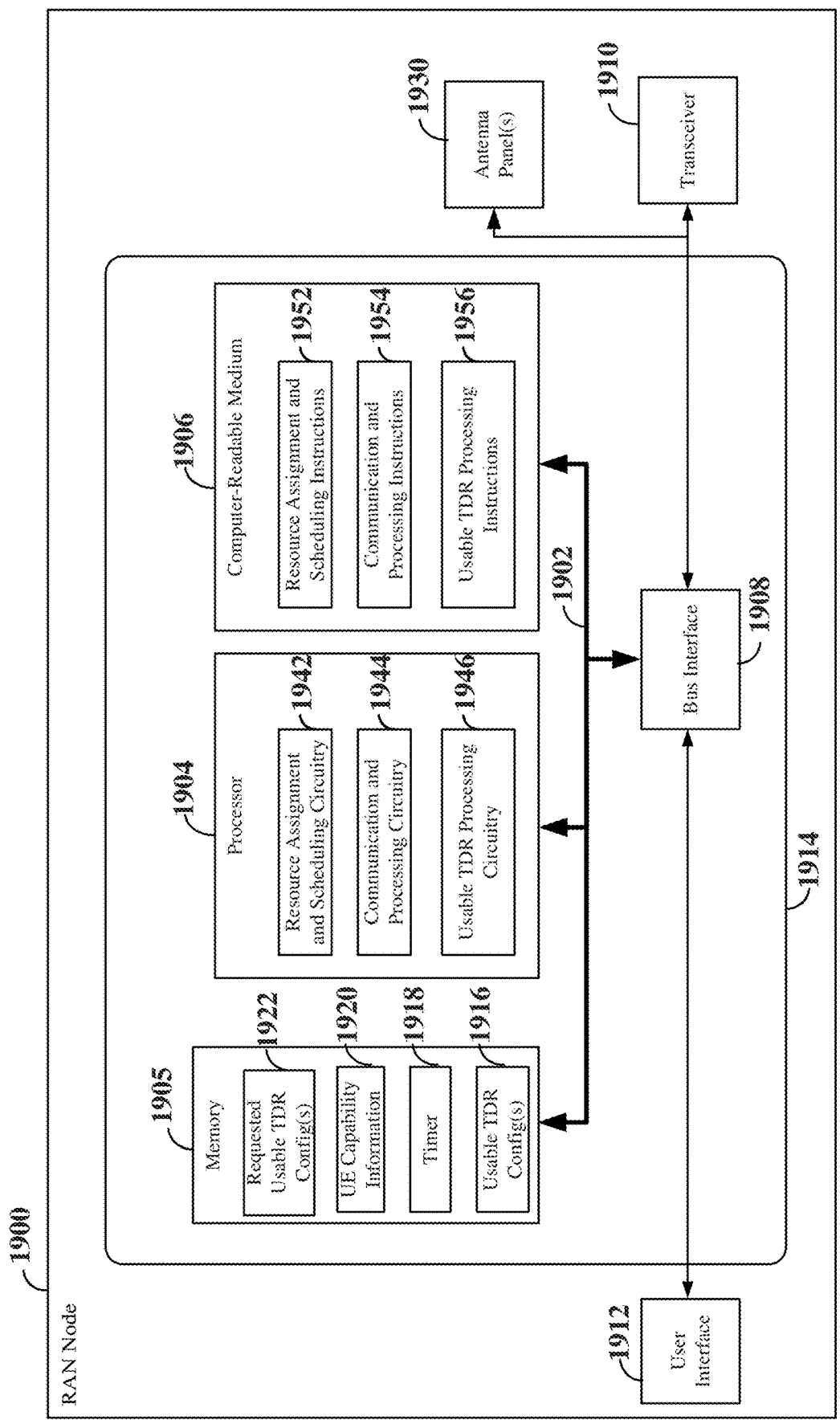
FIG. 19 is a block diagram illustrating an example of a hardware implementation for a radio access network (RAN) node employing a processing system according to some aspects.

FIG. 19 is a block diagram illustrating an example of a hardware implementation for a radio access network (RAN) node 1900 employing a processing system 1914. For example, the RAN node 1900 may be any of the base stations (e.g., gNBs) or other scheduling entities illustrated in any one or more of FIGS. 1, 2, 5-7, 10, 12, and/or 15-18.

The RAN node 1900 may be implemented with a processing system 1914 that includes one or more processors 1904. Examples of processors 1904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1900 may be configured to perform any one or more of the functions described herein. That is, the processor 1904, as utilized in a RAN node 1900, may be used to implement any one or more of the processes and procedures described herein and illustrated in FIGS. 7, 10, 12, 15-18, and/or 20.

The processor 1904 may in some instances be implemented via a baseband or modem chip and in other implementations, the processor 1904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 communicatively couples together various circuits including one or more processors (represented generally by the processor 1904), a memory 1905, and computer-readable media (represented generally by the computer-readable medium 1906). The bus 1902 may also link various other circuits such as timing sources, peripherals, voltage regulators, and power management circuits, which are well known in the art, and therefore, will not be described any further.

A bus interface 1908 provides an interface between the bus 1902, a transceiver 1910, and one or more antenna panels 1930. The transceiver 1910 and antenna panels 1930 provide a communication interface or a means for communicating with various other apparatus over a transmission medium (e.g., air interface). Depending upon the nature of the apparatus, a user interface 1912 (e.g., keypad, display, speaker, microphone, joystick) may also be provided. Of course, such a user interface 1912 is optional, and may be omitted in some examples.

The processor 1904 is responsible for managing the bus 1902 and general processing, including the execution of software stored on the computer-readable medium 1906. The software, when executed by the processor 1904, causes the processing system 1914 to perform the various functions described below for any particular apparatus. The computer-readable medium 1906 and the memory 1905 may also be used for storing data that is manipulated by the processor 1904 when executing software. For example, the memory 1905 may store one or more of usable time domain resource (TDR) configuration(s) 1916, a timer 1918, UE capability information 1920, or one or more requested usable TDR configuration(s) 1922 that may be used by the processor 1904 in adapting the usable time domain resources for one or more UEs.

One or more processors 1904 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1906.

The computer-readable medium 1906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities including the processing system 1914. The computer-readable medium 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1904 may include circuitry configured for various functions. For example, the processor 1904 may include resource assignment and scheduling circuitry 1942, configured to generate, schedule, and modify a resource assignment or grant of time—frequency resources (e.g., a set of one or more resource elements). For example, the resource assignment and scheduling circuitry 1942 may schedule time—frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1942 may be configured to schedule resources for the transmission of at least one usable TDR configuration 1916 to a UE for use in communicating with the UE via usable time resources indicated in the usable TDR configuration 1916. In some examples, the usable TDR configuration(s) 1916 may be transmitted via, for example, DCI, a MAC-CE, or a RRC message. In some examples, the resource assignment and scheduling circuitry 1942 may be configured to schedule resources for the transmission of a plurality of usable TDR configurations 1916 to the UE via, for example, an RRC message. In addition, the resource assignment and scheduling circuitry 1942 may schedule resources for the transmission of an activation message to the UE via DCI or a MAC-CE to activate one or more of the plurality of usable TDR configurations.

In addition, the resource assignment and scheduling circuitry 1942 may be configured to schedule resources for the reception of a message from the UE containing the UE capability information 1920 from the UE and/or a request from the UE containing the requested usable TDR configuration(s) 1922. The resource assignment and scheduling circuitry 1942 may further be configured to schedule resources for the transmission of a deactivation message to the UE to deactivate the usable TDR configuration(s) 1916 configured for the UE.

The resource assignment and scheduling circuitry 1942 may further be configured to schedule resources for one or more communications (e.g., downlink and/or uplink) between the RAN node 1900 and the UE within the usable time resources of one or more usable TDR configurations 1916 configured for the UE. In some examples, the resource assignment and scheduling circuitry 1942 may be configured to schedule resources for the one or more communications utilizing a time domain resource numbering scheme based on the usable TDR configuration. For example, the time domain resource numbering scheme may exclude unusable time resources outside of the usable time resources indicated in the usable TDR configuration 1916.

In some examples, the resource assignment and scheduling circuitry 1942 may further be configured to schedule resources for an SPS configuration for a UE. In addition, the resource assignment and scheduling circuitry 1942 may be configured to schedule resources for the transmission of the SPS configuration indicating the allocated resources to the UE. For example, the SPS configuration may indicate the allocated resources for SPS occasions of a periodicity p, which defines the duration of time between two consecutive SPS occasions. The resource assignment and scheduling circuitry 1942 may further be configured to execute resource assignment and scheduling instructions (software) 1952 stored on the computer-readable medium 1906 to implement one or more of the functions described herein.

The processor 1904 may further include communication and processing circuitry 1944, configured to communicate with one or more UEs via Uu links. In some examples, the communication and processing circuitry 1944 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1944 may include one or more transmit/receive chains.

In some implementations where the communication involves receiving information, the communication and processing circuitry 1944 may obtain information from a component of the RAN node 1900 (e.g., from the transceiver 1910 that receives the information via radio frequency signaling or some other type of signaling suitable for the applicable communication medium), process (e.g., decode) the information, and output the processed information. For example, the communication and processing circuitry 1944 may output the information to another component of the processor 1904, to the memory 1905, or to the bus interface 1908. In some examples, the communication and processing circuitry 1944 may receive one or more of signals, messages, other information, or any combination thereof. In some examples, the communication and processing circuitry 1944 may receive information via one or more channels. In some examples, the communication and processing circuitry 1944 may include functionality for a means for receiving. In some examples, the communication and processing circuitry 1944 may include functionality for a means for processing, including a means for demodulating, a means for decoding, etc.

In some implementations where the communication involves sending (e.g., transmitting) information, the communication and processing circuitry 1944 may obtain information (e.g., from another component of the processor 1904, the memory 1905, or the bus interface 1908), process (e.g., modulate, encode, etc.) the information, and output the processed information. For example, the communication and processing circuitry 1944 may output the information to the transceiver 1910 (e.g., that transmits the information via radio frequency signaling or some other type of signaling suitable for the applicable communication medium). In some examples, the communication and processing circuitry 1944 may send one or more of signals, messages, other information, or any combination thereof. In some examples, the communication and processing circuitry 1944 may send information via one or more channels. In some examples, the communication and processing circuitry 1944 may include functionality for a means for sending (e.g., a means for transmitting). In some examples, the communication and processing circuitry 1944 may include functionality for a means for generating, including a means for modulating, a means for encoding, etc.

In some examples, the communication and processing circuitry 1944 may be configured to transmit a usable TDR configuration 1916 to a UE. The usable TDR configuration 1916 indicates usable time resources of a plurality of time resources that are available to the UE for communication with the RAN node 1900. The communication and processing circuitry 1944 may further be configured to communicate with the UE based on the usable TDR configuration 1916. In some examples, the usable TDR configuration 1916 may be transmitted via, for example, DCI, a MAC-CE, or a RRC message. In some examples, the communication and processing circuitry 1944 may be configured to transmit a plurality of usable TDR configurations 1916 to the UE via, for example, an RRC message. In addition, the communication and processing circuitry 1944 may be configured to transmit an activation message to the UE via DCI or a MAC-CE to activate one or more of the plurality of usable TDR configurations.

In addition, the communication and processing circuitry 1944 may be configured to receive a message from the UE containing the UE capability information 1920 of the UE and/or a request from the UE containing the requested usable TDR configuration(s) 1922. The communication and processing circuitry 1944 may further be configured to transmit a deactivation message to the UE to deactivate the usable TDR configuration(s) 1916 configured for the UE.

The communication and processing circuitry 1944 may further be configured to transmit scheduling information scheduling one or more communications (e.g., downlink and/or uplink) between the RAN node 1900 and the UE within the usable time resources of one or more usable TDR configurations 1916 configured for the UE. In some examples, the communication and processing circuitry 1944 may be configured to transmit an SPS configuration associated with a pre-scheduled transmission to a UE. In addition, the communication and processing circuitry 1944 may be configured to communicate the pre-scheduled transmission with the UE based on the usable TDR configuration. The communication and processing circuitry 1944 may further be configured to execute communication and processing instructions (software) 1954 stored in the computer-readable medium 1906 to implement one or more of the functions described herein.

The processor 1904 may further include usable TDR processing circuitry 1946, configured to generate one or more usable TDR configurations 1916 for a UE or a group of UEs. In some examples, the usable TDR processing circuitry 1946 may generate the usable TDR configuration 1916 to have a particular time resource granularity. For example, the time resource granularity may be a symbol-level granularity or a slot-level granularity. In some examples, the usable TDR processing circuitry 1946 may generate the usable TDR configuration 1916 to include a reduction factor, a pattern mask, or other suitable time domain resource identification mechanism that can be used to indicate the usable time resources. In some examples, the usable TDR processing circuitry 1946 may generate the usable TDR configuration to be aligned to a time domain resource boundary. In some examples, the usable TDR processing circuitry 1946 may be configured to generate the usable TDR configuration 1916 to have a repeating configuration that indicates the usable time resources. In some examples, the usable TDR processing circuitry 1946 may generate the usable TDR configuration(s) 1916 to each be associated with one or more of at least one respective transmission configuration indicator (TCI) state, at least one respective sub-band, at least one respective antenna panel on the UE, or a group of UEs including the UE.

In some examples, the usable TDR processing circuitry 1946 may further be configured to identify or select a time domain resource numbering scheme associated with the usable TDR configuration 1916. The usable TDR processing circuitry 1946 may further be configured to provide the time domain resource numbering scheme to the resource assignment and scheduling circuitry 1942 for scheduling downlink and uplink transmissions, including HARQ feedback, between the RAN node 1900 and the UE.

In some examples, the usable TDR processing circuitry 1946 may generate the usable TDR configuration(s) 1916 to each be associated with a respective initialization time thereof. The initialization time provides a time gap between communication of the usable TDR configuration and initialization of the usable TDR configuration. The usable TDR processing circuitry 1946 may be configured to initialize a usable TDR configuration 1916 at the corresponding initialization time.

In some examples, the usable TDR processing circuitry 1946 may generate or select one or more usable TDR configurations 1916 for the UE based on the UE capability information 1920 and/or the requested usable TDR configuration 1922. For example, the usable TDR processing circuitry 1946 may generate a plurality of usable TDR configurations 1916 for a cell or a UE. The usable TDR processing circuitry 1946 may then select one or more of the plurality of usable TDR configurations 1916 for the UE based on the UE capability information 1920 and/or the requested usable TDR configuration 1922.

In some examples, the usable TDR processing circuitry 1946 may operate together with the communication and processing circuitry 1944 to transmit the plurality of usable TDR configurations to the UE, and to further transmit an activation message to activate at least one usable TDR configuration of the plurality of usable TDR configurations 1916. In some examples, the activation message includes a codepoint representing the at least one usable TDR configuration. In this example, the usable TDR processing circuitry 1946 may operate together with the communication and processing circuitry 1944 to transmit the codepoints and corresponding usable TDR configurations to the UE.

In some examples, the usable TDR processing circuitry 1946 may deactivate the usable TDR configuration 1916 for the UE. In some examples, the usable TDR processing circuitry 1946 may operate together with the communication and processing circuitry 1944 to transmit an explicit deactivation message to the UE to deactivate one or more usable TDR configuration(s) 1916 on the UE. In some examples, the usable TDR processing circuitry 1946 may select a timer value for the timer 1918 and initiate the timer 1918 with the timer value upon transmission/reception of the usable TDR configuration 1916. The usable TDR processing circuitry 1946 may further operate together with the communication and processing circuitry 1944 to transmit the timer value to the UE. For example, the timer value may be included in the usable TDR configuration 1916. At expiration of the timer 1918, the usable TDR processing circuitry 1946 may deactivate the usable TDR configuration 1916.

In some examples, the usable TDR processing circuitry 1946 may be configured to identify overlapping time resources between a first set of time resources outside of the usable time resources of a usable TDR configuration 1916 for a UE and a second set of time resources pre-scheduled for a transmission between the RAN node 1900 and the UE. The overlapping time resources indicate a collision between the usable TDR configuration 1916 and the pre-scheduled transmission (e.g., an SPS transmission). In some examples, the usable TDR processing circuitry 1946 may be configured to operate together with the communication and processing circuitry 1944 to selectively communicate the pre-scheduled transmission between the RAN node 1900 and the UE based on the usable TDR configuration 1916. For example, the usable TDR processing circuitry 1946 may be configured to either drop the pre-scheduled transmission (e.g., not transmit or receive the pre-scheduled transmission), communicate the pre-scheduled transmission utilizing the second set of time resources, or rate-match the pre-scheduled transmission around the overlapping time resources. The usable TDR processing circuitry 1946 may further be configured to execute usable TDR processing instructions (software) 1956 stored in the computer-readable medium 1906 to implement one or more of the functions described herein.

Figure 20:
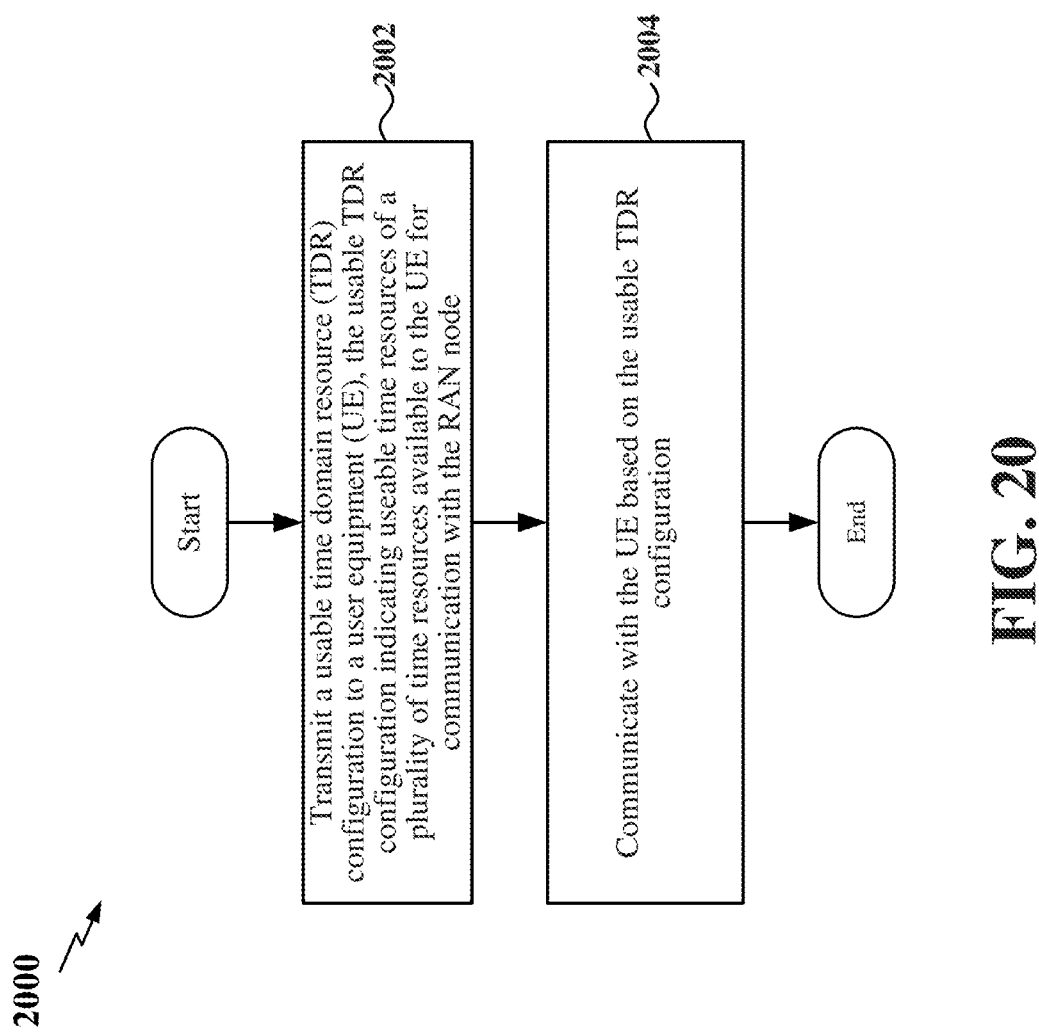
FIG. 20 is a flow chart illustrating an exemplary process for communicating with a UE based on a usable TDR configuration according to some aspects.

FIG. 20 is a flow chart illustrating an exemplary process 2000 for communicating with a UE based on a usable TDR configuration according to some aspects. As described below, some or all illustrated features may be omitted in a particular implementation within the scope of the present disclosure, and some illustrated features may not be required for implementation of all examples. In some examples, the process 2000 may be carried out by the RAN node 1900 illustrated in FIG. 19. In some examples, the process 2000 may be carried out by any suitable apparatus or means for carrying out the functions or algorithms described below.

At block 2002, the RAN node may transmit a usable time domain resource (TDR) configuration to a user equipment (UE). The usable TDR configuration indicates usable time resources of a plurality of time resources available to the UE for communication with the RAN node. In some examples, the RAN node may transmit the usable TDR configuration to the UE via downlink control information (DCI), a medium access control (MAC) control element (MAC-CE), or a radio resource control (RRC) message. In some examples, the usable TDR configuration includes a time resource granularity. In some examples, the usable TDR configuration includes a reduction factor or a pattern mask indicating the usable time resources. In some examples, the usable TDR configuration is aligned to a time domain resource boundary. In some examples, the usable TDR configuration includes a repeating configuration indicating the usable time resources. In some examples, the usable TDR configuration is associated with one or more of at least one transmission configuration indicator (TCI) state, at least one sub-band, at least one antenna panel on the UE, or a group of UEs including the UE.

In some examples, the usable TDR configuration is one of a plurality of usable TDR configurations. In this example, the RAN node may further transmit an activation message to activate at least the usable TDR configuration of the plurality of usable TDR configurations. In some examples, the RAN node may further deactivate the usable TDR configuration. In some examples, the RAN node may select the usable TDR configuration of the plurality of usable TDR configurations based on a capability of the UE. In some examples, the RAN node may receive a request for the usable TDR configuration from the UE. In some examples, the usable TDR configuration is associated with an initialization time of the usable TDR configuration. For example, the communication and processing circuitry 1944, together with the usable TDR processing circuitry 1946, transceiver 1910, and antenna panel(s) 1930, shown and described above in connection with FIG. 19 may provide a means to transmit the usable TDR configuration.

At block 2004, the RAN node may communicate with the UE based on the usable TDR configuration. In some examples, the RAN node may transmit scheduling information to the UE scheduling a communication between the UE and the RAN node within the usable time resources. In some examples, the RAN node may schedule one or more communications with the UE utilizing a time domain resource numbering scheme based on the usable TDR configuration. In some examples, the time domain resource numbering scheme excludes unusable time resources of the plurality of time resources outside of the usable time resources.

In some examples, the RAN node may identify overlapping time resources between a first set of time resources of the plurality of time resources outside of the usable time resources and a second set of time resources of the plurality of time resources pre-scheduled for a transmission between the RAN node and the UE. In one example, the RAN node may drop the transmission between the RAN node and the UE. In another example, the RAN node may communicate the transmission between the RAN node and the UE utilizing the second set of time resources. In some examples, the RAN node may rate-match the transmission around the overlapping time resources. For example, the communication and processing circuitry 1944, together with the usable TDR processing circuitry 1946, transceiver 1910, and antenna panel(s) 1930, shown and described above in connection with FIG. 19 may provide a means to communicate with the UE based on the usable TDR configuration.

In one configuration, the RAN node 1900 includes means for performing the various functions and processes described in relation to FIG. 20. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1, 2, 5-7, 10, 12, and/or 15-18, and utilizing, for example, the processes and/or algorithms described herein in relation to FIG. 20.

Figure 21:
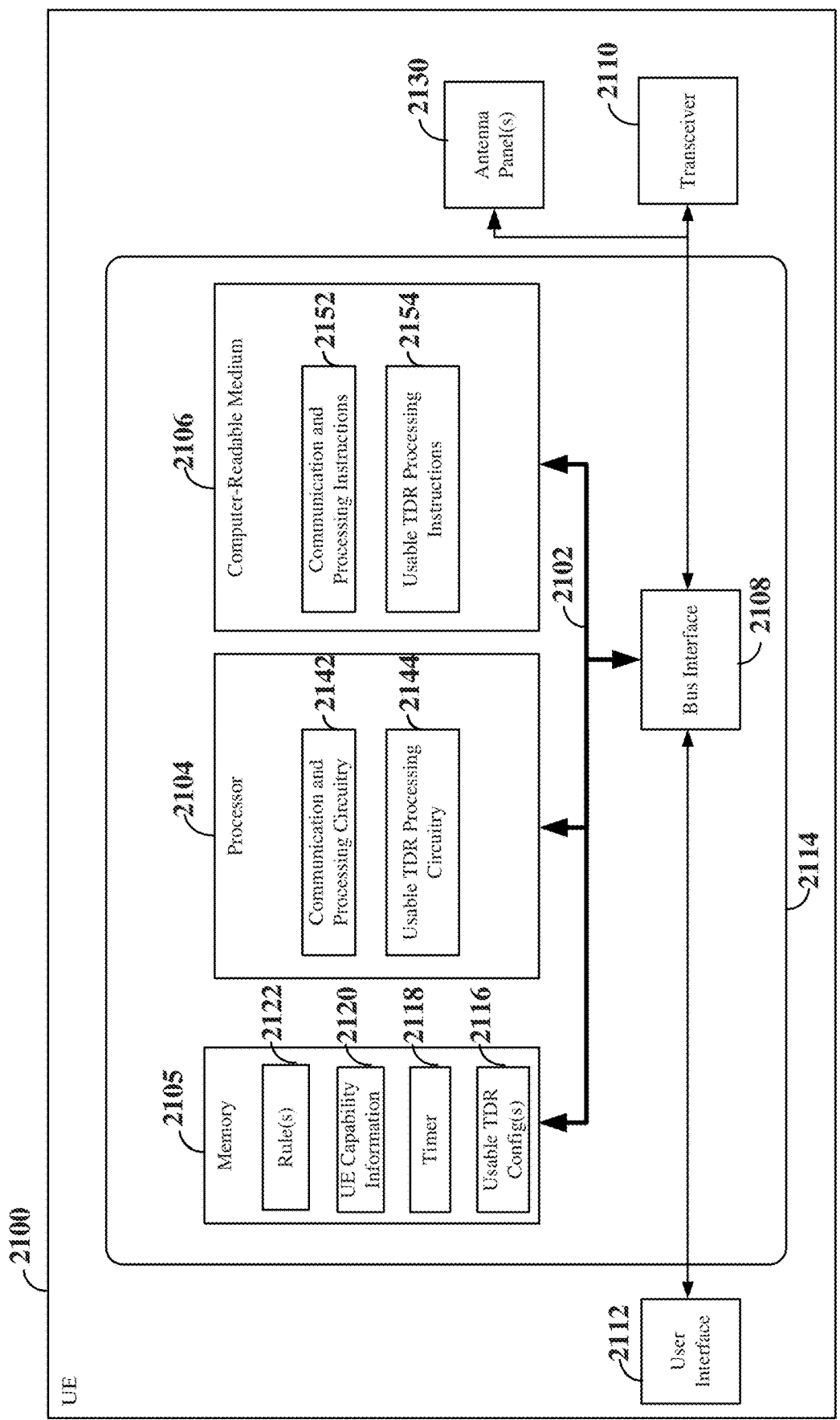
FIG. 21 is a block diagram illustrating an example of a hardware implementation for a UE employing a processing system according to some aspects.

FIG. 21 is a block diagram illustrating an example of a hardware implementation for a user equipment (UE) 2100 employing a processing system 2114. For example, the UE 2100 may be any of the UEs, wireless communication devices, or other scheduled entities illustrated in any one or more of FIGS. 1, 2, 5-7, 10, 12, and/or 15-18.

In accordance with various aspects of the disclosure, an element, or any portion of an element, or any combination of elements may be implemented with a processing system 2114 that includes one or more processors 2104. The processing system 2114 may be substantially the same as the processing system 1914 illustrated in FIG. 19, including a bus interface 2108, a bus 2102, memory 2105, a processor 2104, and a computer-readable medium 2106. Furthermore, the UE 2100 may include an optional user interface 2112, a transceiver 2110, and one or more antenna panels 2130 substantially similar to those described above in FIG. 19. That is, the processor 2104, as utilized in a UE 2100, may be used to implement any one or more of the processes described below. The computer-readable medium 2106 and the memory 2105 may also be used for storing data that is manipulated by the processor 2104 when executing software. For example, the memory 2105 may store one or more of usable time domain resource (TDR) configuration(s) 2116, a timer 2118, UE capability information 2120, or one or more rules 2122 that may be used by the processor 2104 in adapting the usable time domain resources for the UE 2100.

In some aspects of the disclosure, the processor 2104 may include circuitry configured for various functions. For example, the processor 2104 may include communication and processing circuitry 2142, configured to communicate with a RAN node (e.g., a base station), such as a gNB or eNB via a Uu link. In some examples, the communication and processing circuitry 2142 may include one or more hardware components that provide the physical structure that performs processes related to wireless communication (e.g., signal reception and/or signal transmission) and signal processing (e.g., processing a received signal and/or processing a signal for transmission).

In some implementations where the communication involves receiving information, the communication and processing circuitry 2142 may obtain information from a component of the UE 2100 (e.g., from the transceiver 2110 that receives the information via radio frequency signaling or some other type of signaling suitable for the applicable communication medium), process (e.g., decode) the information, and output the processed information. For example, the communication and processing circuitry 2142 may output the information to another component of the processor 2104, to the memory 2105, or to the bus interface 2108. In some examples, the communication and processing circuitry 2142 may receive one or more of signals, messages, other information, or any combination thereof. In some examples, the communication and processing circuitry 2142 may receive information via one or more channels. In some examples, the communication and processing circuitry 2142 may include functionality for a means for receiving. In some examples, the communication and processing circuitry 2142 may include functionality for a means for processing, including a means for demodulating, a means for decoding, etc.

In some implementations where the communication involves sending (e.g., transmitting) information, the communication and processing circuitry 2142 may obtain information (e.g., from another component of the processor 2104, the memory 2105, or the bus interface 2108), process (e.g., modulate, encode, etc.) the information, and output the processed information. For example, the communication and processing circuitry 2142 may output the information to the transceiver 2110 (e.g., that transmits the information via radio frequency signaling or some other type of signaling suitable for the applicable communication medium). In some examples, the communication and processing circuitry 2142 may send one or more of signals, messages, other information, or any combination thereof. In some examples, the communication and processing circuitry 2142 may send information via one or more channels. In some examples, the communication and processing circuitry 2142 may include functionality for a means for sending (e.g., a means for transmitting). In some examples, the communication and processing circuitry 2142 may include functionality for a means for generating, including a means for modulating, a means for encoding, etc.

In some examples, the communication and processing circuitry 2142 may be configured to receive a usable time domain resource (TDR) configuration from a RAN node (e.g., a base station). The usable TDR configuration indicates usable time resources of a plurality of time resources that are available to the UE for communication with the RAN node. The communication and processing circuitry 2142 is further configured to communicate with the RAN node based on the usable TDR configuration. For example, the communication and processing circuitry 2142 may be configured to identify a time resource of the usable time resources to communicate with the RAN node based on a time domain resource numbering scheme that is based on the usable TDR configuration.

In some examples, the usable TDR configuration 2116 may be received via, for example, DCI, a MAC-CE, or a RRC message. In some examples, the communication and processing circuitry 2142 may be configured to receive a plurality of usable TDR configurations 2116 from the RAN node via, for example, an RRC message. In addition, the communication and processing circuitry 2142 may be configured to receive an activation message from the RAN node via DCI or a MAC-CE to activate one or more of the plurality of usable TDR configurations.

In addition, the communication and processing circuitry 2142 may be configured to transmit a message to the RAN node containing the UE capability information 2120 of the UE and/or a request from the UE containing one or more requested usable TDR configuration(s). The communication and processing circuitry 2142 may further be configured to receive a deactivation message from the RAN node to deactivate the usable TDR configuration(s) 2116 configured for the UE.

The communication and processing circuitry 2142 may further be configured to receive scheduling information from the RAN node scheduling one or more communications (e.g., downlink and/or uplink) between the RAN node and the UE 2100 within the usable time resources of one or more usable TDR configurations 2116 configured for the UE. In some examples, the communication and processing circuitry 2142 may be configured to receive an SPS configuration associated with a pre-scheduled transmission from the RAN node. In addition, the communication and processing circuitry 2142 may be configured to communicate the pre-scheduled transmission with the RAN node based on the usable TDR configuration. The communication and processing circuitry 2142 may further be configured to execute communication and processing instructions (software) 2152 stored in the computer-readable medium 2106 to implement one or more of the functions described herein.

The processor 2104 may further include usable TDR processing circuitry 2144, configured to process one or more usable TDR configurations 2116 received from a RAN node. In some examples, the usable TDR configuration 2116 may have a particular time resource granularity. For example, the time resource granularity may be a symbol-level granularity or a slot-level granularity. In some examples, the usable TDR configuration 2116 may include a reduction factor, a pattern mask, or other suitable time domain resource identification mechanism that can be used to indicate the usable time resources. In some examples, the usable TDR configuration may be aligned to a time domain resource boundary. In some examples, the usable TDR configuration 2116 may have a repeating configuration that indicates the usable time resources. In some examples, the usable TDR configuration(s) 2116 may each be associated with one or more of at least one respective transmission configuration indicator (TCI) state, at least one respective sub-band, at least one respective antenna panel on the UE, or a group of UEs including the UE 2100.

In some examples, the usable TDR configuration 2116 may each have a time domain resource numbering scheme associated therewith. The time domain resource numbering scheme may be included in the usable TDR configuration 2116 or may be received separately from the usable TDR configuration 2116 (e.g., via RRC signaling). In some examples, the time domain resource numbering scheme applies to each of the usable TDR configurations 2116 received from the RAN node. In other examples, a respective time domain resource numbering scheme may apply to each usable TDR configuration 2116. For example, a first time domain resource numbering scheme may apply to a first usable TDR configuration 2116 and a second time domain resource numbering scheme different than the first time domain resource numbering scheme may apply to a second usable TDR configuration 2116. In some examples, only one of the first and second usable TDR configurations 2116 may be activated at a time.

In some examples, the usable TDR configuration(s) 2116 may each be associated with a respective initialization time thereof. The initialization time provides a time gap between communication of the usable TDR configuration and initialization of the usable TDR configuration. The usable TDR processing circuitry 2144 may be configured to initialize a usable TDR configuration 2116 at the corresponding initialization time.

In some examples, the usable TDR processing circuitry 2144 may be configured to generate a request for one or more usable TDR configuration(s) 2116 to the RAN node. In some examples, the usable TDR processing circuitry 2144 may utilize one or more rules 2122 configured on the UE to determine the requested usable TDR configuration(s). For example, the rules 2122 may be pre-configured (e.g., by the OEM based on one or more NR standards or specifications) or may be received from the RAN node. In some examples, the one or more rules 2122 may include one or more metrics, thresholds, or other assistance information utilized by the usable TDR processing circuitry 2144 to identify the one or more usable TDR configurations that may be requested. In some examples, the assistance information may be associated with an antenna panel or group of antenna panels on the UE.

In some examples, the assistance information may include a plurality of usable TDR configurations from which the usable TDR processing circuitry 2144 can select. For example, the plurality of usable TDR configurations may be usable TDR configurations available in the cell or pre-generated for the UE 2100 by the RAN node. For example, each of the plurality of usable TDR configurations may have a respective time domain resource granularity or be based on a respective usable time domain resource identification mechanism. In addition, each of the plurality of usable TDR configurations may be repeating or may be aligned to a time domain resource boundary. Furthermore, each of the plurality of usable TDR configurations may be universal configurations or may be applicable to one or more TCI states, one or more sub-bands, one or more antenna panels on the UE, and/or a group of UEs including the UE 2100. The usable TDR processing circuitry 2144 may then select one or more usable TDR configurations 2116 from the plurality of usable TDR configurations based on the one or more rules 2122, and transmit the request for the selected usable TDR configuration(s) 2116 to the RAN node.

In some examples, the usable TDR processing circuitry 2144 may operate together with the communication and processing circuitry 2142 to receive a plurality of usable TDR configurations 2116 from the RAN node, and to further receive an activation message to activate at least one usable TDR configuration of the plurality of usable TDR configurations 2116. In some examples, the activation message includes a codepoint representing the at least one usable TDR configuration. In this example, the usable TDR processing circuitry 2144 may operate together with the communication and processing circuitry 2142 to receive the codepoints and corresponding usable TDR configurations from the RAN node.

In some examples, the usable TDR processing circuitry 2144 may deactivate the usable TDR configuration 2116 for the UE. In some examples, the usable TDR processing circuitry 2144 may operate together with the communication and processing circuitry 2142 to receive an explicit deactivation message from the RAN node to deactivate one or more usable TDR configuration(s) 2116 on the UE. In some examples, the usable TDR processing circuitry 2144 may receive a timer value for the timer 2118 from the RAN node and initiate the timer 2118 with the timer value upon transmission/reception of the usable TDR configuration 2116. At expiration of the timer 2118, the usable TDR processing circuitry 2144 may deactivate the usable TDR configuration 2116.

In some examples, the usable TDR processing circuitry 2144 may be configured to identify overlapping time resources between a first set of time resources outside of the usable time resources of a usable TDR configuration 2116 for the UE 2100 and a second set of time resources pre-scheduled for a transmission between the RAN node and the UE 2100. The overlapping time resources indicate a collision between the usable TDR configuration 2116 and the pre-scheduled transmission (e.g., an SPS transmission). In some examples, the usable TDR processing circuitry 2144 may be configured to operate together with the communication and processing circuitry 2142 to selectively communicate the pre-scheduled transmission between the RAN node and the UE 2100 based on the usable TDR configuration 2116. For example, the usable TDR processing circuitry 2144 may be configured to either drop the pre-scheduled transmission (e.g., not transmit or receive the pre-scheduled transmission), communicate the pre-scheduled transmission utilizing the second set of time resources, or rate-match the pre-scheduled transmission around the overlapping time resources. The usable TDR processing circuitry 2144 may further be configured to execute usable TDR processing instructions (software) 2154 stored in the computer-readable medium 2106 to implement one or more of the functions described herein.

Figure 22:
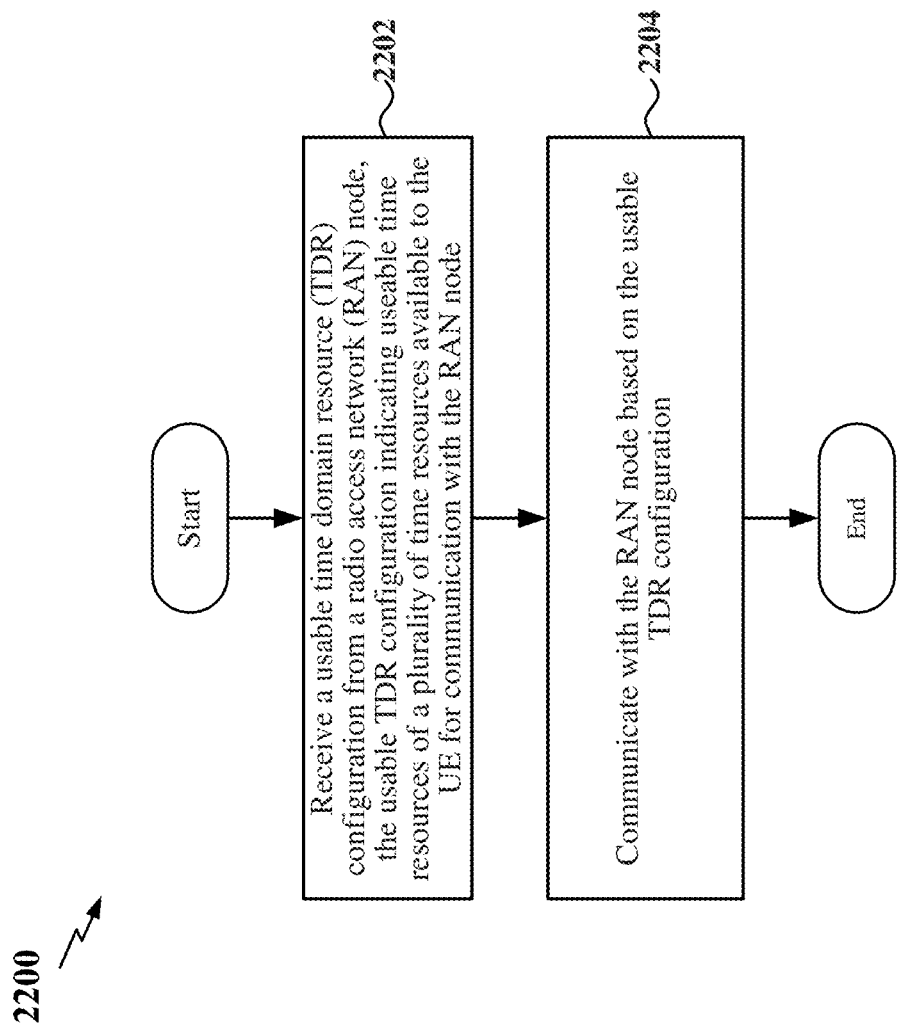
FIG. 22 is a flow chart illustrating an exemplary process for communicating with a RAN node based on a usable TDR configuration according to some aspects.

FIG. 22 is a flow chart illustrating an exemplary process 2200 for communicating with a RAN node based on a usable TDR configuration according to some aspects. As described below, some or all illustrated features may be omitted in a particular implementation within the scope of the present disclosure, and some illustrated features may not be required for implementation of all examples. In some examples, the process 2200 may be carried out by the UE 2100 illustrated in FIG. 21. In some examples, the process 2200 may be carried out by any suitable apparatus or means for carrying out the functions or algorithms described below.

At block 2202, a UE may receive a usable time domain resource (TDR) configuration from a radio access network (RAN) node. The usable TDR configuration indicates usable time resources of a plurality of time resources available to the UE for communication with the RAN node. In some examples, the usable TDR configuration includes a reduction factor or a pattern mask indicating the usable time resources. In some examples, the usable TDR configuration is one of a plurality of usable TDR configurations. In this example, the UE may transmit a request for the usable TDR configuration to the RAN node based on one or more rules. For example, the communication and processing circuitry 2142, together with the usable TDR processing circuitry 2144, transceiver 2110, and antenna panel(s) 2130, shown and described above in connection with FIG. 21 may provide a means to receive the usable TDR configuration.

At block 2204, the UE may communicate with the RAN node based on the usable TDR configuration. In some examples, the UE may receive scheduling information from the RAN node scheduling a communication between the UE and the RAN node within the usable time resources. In some examples, the UE may identify a time resource of the usable time resources to communicate with the RAN node based on a time domain resource numbering scheme. The time domain resource numbering scheme is based on the usable TDR configuration. In some examples, the UE may identify overlapping time resources between a first set of time resources outside of the usable time resources and a second set of time resources of the plurality of time resources pre-scheduled for a transmission between the RAN node and the UE. The UE may then selectively communicate the transmission between the RAN node and the UE based on the usable TDR configuration. For example, the communication and processing circuitry 2142, together with the usable TDR processing circuitry 2144, transceiver 2110, and antenna panel(s) 2130, shown and described above in connection with FIG. 21 may provide a means to communicate with the RAN node based on the usable TDR configuration.

In one aspect, the aforementioned means may be the processor 2104 shown in FIG. 21 configured to perform the functions recited by the aforementioned means. In another aspect, the aforementioned means may be a circuit or any apparatus configured to perform the functions recited by the aforementioned means.

Of course, in the above examples, the circuitry included in the processor 2104 is merely provided as an example, and other means for carrying out the described functions may be included within various aspects of the present disclosure, including but not limited to the instructions stored in the computer-readable storage medium 2106, or any other suitable apparatus or means described in any one of the FIGS. 1, 2, 5-7, 10, 12, and/or 15-18, and utilizing, for example, the processes and/or algorithms described herein in relation to FIG. 22.

The following provides an overview of examples of the present disclosure.

Example 1: A method of wireless communication at a radio access network (RAN) node, comprising: transmitting a usable time domain resource (TDR) configuration to a user equipment (UE), the usable TDR configuration indicating useable time resources of a plurality of time resources available to the UE for communication with the RAN node; and communicating with the UE based on the usable TDR configuration.

Example 2: The method of example 1, wherein the communicating with the UE based on the usable TDR configuration comprises: transmitting scheduling information to the UE, the scheduling information scheduling a communication between the UE and the RAN node within the usable time resources.

Example 3: The method of example 1 or 2, wherein the transmitting the usable TDR configuration comprises: transmitting the usable TDR configuration to the UE via downlink control information (DCI), a medium access control (MAC) control element (MAC-CE), or a radio resource control (RRC) message.

Example 4: The method of any of examples 1 through 3, wherein the usable TDR configuration comprises a time resource granularity.

Example 5: The method of any of examples 1 through 4, wherein the usable TDR configuration comprises a reduction factor or a pattern mask indicating the usable time resources.

Example 6: The method of any of examples 1 through 5, wherein the usable TDR configuration is aligned to a time domain resource boundary.

Example 7: The method of any of examples 1 through 5, wherein the usable TDR configuration comprises a repeating configuration indicating the usable time resources.

Example 8: The method of any of examples 1 through 7, further comprising: identifying overlapping time resources between a first set of time resources of the plurality of time resources outside of the usable time resources and a second set of time resources of the plurality of time resources pre-scheduled for a transmission between the RAN node and the UE.

Example 9: The method of example 8, further comprising: dropping the transmission between the RAN node and the UE.

Example 10: The method of example 8, further comprising: communicating the transmission between the RAN node and the UE utilizing the second set of time resources.

Example 11: The method of example 10, wherein the communicating the transmission between the RAN node and the UE further comprises: rate-matching the transmission around the overlapping resources.

Example 12: The method of any of examples 1 through 11, further comprising:
deactivating the usable TDR configuration.

Example 13: The method of example 1, further comprising: scheduling one or more communications with the UE utilizing a time domain resource numbering scheme based on the usable TDR configuration.

Example 14: The method of example 13, wherein the time domain resource numbering scheme excludes unusable time resources of the plurality of time resources outside of the usable time resources.

Example 15: The method of any of examples 1 through 14, wherein the usable TDR configuration is one of a plurality of usable TDR configurations.

Example 16: The method of example 15, further comprising: transmitting an activation message to activate at least the usable TDR configuration of the plurality of usable TDR configurations.

Example 17: The method of example 15 or 16, further comprising: selecting the usable TDR configuration of the plurality of usable TDR configurations based on a capability of the UE.

Example 18: The method of any of examples 15 through 17, further comprising: receiving a request for the usable TDR configuration from the UE.

Example 19: The method of any of examples 1 through 18, wherein the usable TDR configuration is associated with an initialization time of the usable TDR configuration.

Example 20: The method of any of examples 1 through 19, wherein the usable TDR configuration is associated with one or more of at least one transmission configuration indicator (TCI) state, at least one sub-band, at least one antenna panel on the UE, or a group of UEs including the UE.

Example 21: A radio access network (RAN) node configured for wireless communication comprising a transceiver, a memory, and a processor coupled to the transceiver and the memory, wherein the processor and the memory are configured to perform a method of any of examples 1 through 20.

Example 22: A RAN node configured for wireless communication comprising means for performing a method of any of examples 1 through 21.

Example 23: A non-transitory computer-readable medium having stored therein instructions executable by one or more processors of a RAN node configured for wireless communication to perform a method of any of examples 1 through 21.

Example 24: A method of wireless communication at a user equipment (UE), comprising: receiving a usable time domain resource (TDR) configuration from a radio access network (RAN) node, the usable TDR configuration indicating useable time resources of a plurality of time resources available to the UE for communication with the RAN node; and communicating with the RAN node based on the usable TDR configuration.

Example 25: The method of example 24, wherein the communicating with the RAN node based on the usable TDR configuration comprises: receiving scheduling information from the RAN node, the scheduling information scheduling a communication between the UE and the RAN node within the usable time resources.

Example 26: The method of example 24 or 25, wherein the usable TDR configuration comprises a reduction factor or a pattern mask indicating the usable time resources.

Example 27: The method of any of examples 24 through 26, further comprising: identifying overlapping time resources between a first set of time resources of the plurality of time resources outside of the usable time resources and a second set of time resources of the plurality of time resources pre-scheduled for a transmission between the RAN node and the UE; and selectively communicating the transmission between the RAN node and the UE based on the usable TDR configuration.

Example 28: The method of any of examples 24 through 27, further comprising: identifying a time resource of the usable time resources to communicate with the RAN node based on a time domain resource numbering scheme, wherein the time domain resource numbering scheme is based on the usable TDR configuration.

Example 29: The method of any of examples 24 through 28, wherein the usable TDR configuration is one of a plurality of usable TDR configurations, and further comprising: transmitting a request for the usable TDR configuration to the RAN node based on one or more rules.

Example 30: A user equipment (UE) configured for wireless communication comprising a transceiver, a memory, and a processor coupled to the transceiver and the memory, wherein the processor and the memory are configured to perform a method of any of examples 24 through 29.

Example 22: A UE configured for wireless communication comprising means for performing a method of any of examples 24 through 29.

Example 23: A non-transitory computer-readable medium having stored therein instructions executable by one or more processors of a UE configured for wireless communication to perform a method of any of examples 24 through 29.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5-7, 10, 12, 15-19, and/or 21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A radio access network (RAN) node configured for wireless communication, comprising:
   one or more transceivers;
   one or more memories;
   one or more processors coupled to the one or more transceivers and the one or more memories, wherein the one or more processors are configured to:
   transmit a usable time domain resource (TDR) configuration to a user equipment (UE) via the one or more transceivers, the usable TDR configuration indicating usable time resources of a plurality of time resources, the usable time resources being resources unallocated to the UE for a downlink transmission or an uplink transmission, the resources further being available to the UE for subsequent communication of data with the RAN node; and
   communicate with the UE via the one or more transceivers based on the usable TDR configuration.

2. The RAN node of claim 1, wherein the one or more processors are further configured to:
   transmit scheduling information to the UE, the scheduling information scheduling a communication between the UE and the RAN node within the usable time resources.

3. The RAN node of claim 1, wherein the one or more processors are further configured to:
   transmit the usable TDR configuration to the UE via downlink control information (DCI), a medium access control (MAC) control element (MAC-CE), or a radio resource control (RRC) message.

4. The RAN node of claim 1, wherein the usable TDR configuration comprises a time domain resource granularity.

5. The RAN node of claim 1, wherein the usable TDR configuration comprises a reduction factor or a pattern mask indicating the usable time resources.

6. The RAN node of claim 1, wherein the usable TDR configuration is aligned to a time domain resource boundary.

7. The RAN node of claim 1, wherein the usable TDR configuration comprises a repeating configuration indicating the usable time resources.

8. The RAN node of claim 1, wherein the one or more processors are further configured to:
   identify overlapping time resources between a first set of time resources of the plurality of time resources outside of the usable time resources and a second set of time resources of the plurality of time resources pre-scheduled for a transmission between the RAN node and the UE.

9. The RAN node of claim 8, wherein the one or more processors are further configured to:
   drop the transmission between the RAN node and the UE.

10. The RAN node of claim 8, wherein the one or more processors are further configured to:
    communicate the transmission between the RAN node and the UE utilizing the second set of time resources.

11. The RAN node of claim 10, wherein the one or more processors are further configured to:
    rate-match the transmission around the overlapping time resources.

12. The RAN node of claim 1, wherein the one or more processors are further configured to:
    deactivate the usable TDR configuration.

13. The RAN node of claim 1, wherein the one or more processors are further configured to:
   schedule one or more communications with the UE utilizing a time domain resource numbering scheme based on the usable TDR configuration.

14. The RAN node of claim 13, wherein the time domain resource numbering scheme excludes unusable time resources of the plurality of time resources outside of the usable time resources.

15. The RAN node of claim 1, wherein the usable TDR configuration is one of a plurality of usable TDR configurations.

16. The RAN node of claim 15, wherein the one or more processors are further configured to:
   transmit an activation message to activate at least the usable TDR configuration of the plurality of usable TDR configurations.

17. The RAN node of claim 15, wherein the one or more processors are further configured to:
   select the usable TDR configuration of the plurality of usable TDR configurations based on a capability of the UE.

18. The RAN node of claim 15, wherein the one or more processors are further configured to:
   receive a request for the usable TDR configuration from the UE.

19. The RAN node of claim 1, wherein the usable TDR configuration is associated with an initialization time of the usable TDR configuration.

20. The RAN node of claim 1, wherein the usable TDR configuration is associated with one or more of at least one transmission configuration indicator (TCI) state, at least one sub-band, at least one antenna panel on the UE, or a group of UEs including the UE.

21. A method of wireless communication at a radio access network (RAN) node, comprising:
   transmitting a usable time domain resource (TDR) configuration to a user equipment (UE), the usable TDR configuration indicating usable time resources of a plurality of time resources, the usable time resources being resources unallocated to the UE for a downlink transmission or an uplink transmission, the resources further being available to the UE for subsequent communication of data with the RAN node; and
   communicating with the UE based on the usable TDR configuration.

22. The method of claim 21, wherein the communicating with the UE based on the usable TDR configuration comprises:
   transmitting scheduling information to the UE, the scheduling information scheduling a communication between the UE and the RAN node within the usable time resources.

23. A user equipment (UE) configured for wireless communication, comprising:
   one or more transceivers;
   one or more memories; and
   one or more processors coupled to the one or more transceivers and the one or more memories, wherein the one or more processors are configured to:
      receive a usable time domain resource (TDR) configuration from a radio access network (RAN) node via the one or more transceivers, the usable TDR configuration indicating usable time resources of a plurality of time resources, the usable time resources being resources unallocated to the UE for a downlink transmission or an uplink transmission, the resources further being available to the UE for subsequent communication of data with the RAN node available to the UE for communication of data with the RAN node; and
      communicate with the RAN node via the one or more transceivers based on the usable TDR configuration.

24. The UE of claim 23, wherein the one or more processors are further configured to:
   receive scheduling information from the RAN node, the scheduling information scheduling a communication between the UE and the RAN node within the usable time resources.

25. The UE of claim 23, wherein the usable TDR configuration comprises a reduction factor or a pattern mask indicating the usable time resources.

26. The UE of claim 23, wherein the one or more processors are further configured to:
   identify overlapping time resources between a first set of time resources of the plurality of time resources outside of the usable time resources and a second set of time resources of the plurality of time resources pre-scheduled for a transmission between the RAN node and the UE; and
   selectively communicate the transmission between the RAN node and the UE based on the usable TDR configuration.

27. The UE of claim 23, wherein the one or more processors are further configured to:
   identify a time resource of the usable time resources to communicate with the RAN node based on a time domain resource numbering scheme, wherein the time domain resource numbering scheme is based on the usable TDR configuration.

28. The UE of claim 23, wherein the usable TDR configuration is one of a plurality of usable TDR configurations, and wherein the one or more processors are further configured to:
   transmit a request for the usable TDR configuration to the RAN node based on one or more rules.

29. A method of wireless communication at a user equipment (UE), comprising:
   receiving a usable time domain resource (TDR) configuration from a radio access network (RAN) node, the usable TDR configuration indicating usable time resources of a plurality of time resources, the usable time resources being resources unallocated to the UE for a downlink transmission or an uplink transmission, the resources further being available to the UE for subsequent communication of data with the RAN node; and
   communicating with the RAN node based on the usable TDR configuration.

30. The method of claim 29, wherein the communicating with the RAN node based on the usable TDR configuration comprises:
   receiving scheduling information from the RAN node, the scheduling information scheduling a communication between the UE and the RAN node within the usable time resources.

* * * * *